US011303404B2

(12) United States Patent
Hosseini et al.

(10) Patent No.: US 11,303,404 B2
(45) Date of Patent: Apr. 12, 2022

(54) DEMODULATION REFERENCE SIGNAL TRANSMISSION

(71) Applicant: QUALCOMM Incorporated, San Diego, CA (US)

(72) Inventors: Seyedkianoush Hosseini, San Diego, CA (US); Amir Farajidana, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/183,637

(22) Filed: Nov. 7, 2018

(65) Prior Publication Data

US 2019/0149288 A1 May 16, 2019

Related U.S. Application Data

(60) Provisional application No. 62/586,161, filed on Nov. 14, 2017.

(51) Int. Cl.
*H04L 5/00* (2006.01)
*H04W 72/14* (2009.01)

(52) U.S. Cl.
CPC .......... *H04L 5/0048* (2013.01); *H04L 5/0051* (2013.01); *H04L 5/0082* (2013.01);
(Continued)

(58) Field of Classification Search
CPC ... H04L 5/0051; H04L 5/0082; H04L 5/0048; H04W 72/14; H04W 72/1278; H04W 72/1263; H04W 72/1205; H04W 72/12
(Continued)

(56) References Cited

U.S. PATENT DOCUMENTS

2008/0095110 A1* 4/2008 Montojo ............... H04L 5/0017
370/330
2013/0039299 A1* 2/2013 Papasakellariou .... H04L 1/0073
370/329
(Continued)

FOREIGN PATENT DOCUMENTS

WO WO-2017138794 A2 8/2017

OTHER PUBLICATIONS

International Search Report and Written Opinion—PCT/US2018/059777—ISA/EPO—dated Jan. 24, 2019 (180831WO).

*Primary Examiner* — Phong La
(74) *Attorney, Agent, or Firm* — QUALCOMM Incorporated

(57) ABSTRACT

Methods, systems, and devices for wireless communications are described. The described techniques generally provide for improved reference signal sharing techniques that support low latency communications. In accordance with the described techniques, a base station may transmit, and a user equipment (UE) may receive, signaling configuring the UE to transmit (or receive) a demodulation reference signal (DMRS) in an indicated transmission time interval (TTI) of a plurality of TTIs, where the DMRS is used for demodulation of a data symbol transmitted in a second TTI of the plurality of TTIs. In various examples, the base station or the UE may determine to skip a data transmission in the indicated TTI (e.g., depending on whether the transmission is in the uplink or downlink direction). The base station or the UE may then transmit the DMRS in the indicated TTI and the data symbol in the second TTI.

55 Claims, 18 Drawing Sheets

(52) U.S. Cl.
CPC .......... *H04W 72/14* (2013.01); *H04L 5/0007* (2013.01); *H04L 5/0044* (2013.01); *H04L 5/0094* (2013.01)

(58) Field of Classification Search
USPC ........................................................ 370/329
See application file for complete search history.

(56) References Cited

U.S. PATENT DOCUMENTS

| | | | |
|---|---|---|---|
| 2016/0065341 A1* | 3/2016 | Yoo ................... H04W 72/1273 370/336 |
| 2016/0197712 A1* | 7/2016 | Sorrentino ............ H04L 5/0051 370/336 |
| 2016/0270059 A1 | 9/2016 | Chen et al. |
| 2016/0381490 A1* | 12/2016 | Rico Alvarino ........ H04W 4/70 370/330 |
| 2017/0272224 A1* | 9/2017 | Ang ...................... H04L 1/1887 |
| 2017/0289992 A1* | 10/2017 | Sun ....................... H04L 5/0051 |
| 2017/0289995 A1* | 10/2017 | Lin ................... H04W 72/0413 |
| 2017/0332369 A1* | 11/2017 | Hosseini ........... H04W 72/0413 |
| 2018/0115984 A1* | 4/2018 | Sahlin ................... H04L 5/0048 |
| 2018/0262307 A1* | 9/2018 | Shimezawa ........... H04L 5/1469 |
| 2018/0270026 A1* | 9/2018 | Lee ........................... H04L 1/18 |
| 2018/0310201 A1* | 10/2018 | Lee ....................... H04W 28/04 |
| 2018/0316469 A1* | 11/2018 | Jiang .................... H04L 5/0051 |
| 2018/0375631 A1* | 12/2018 | Li ......................... H04L 5/0048 |
| 2019/0037554 A1* | 1/2019 | Gao .................. H04W 72/1289 |
| 2019/0052424 A1* | 2/2019 | Manolakos ........... H04L 5/0048 |
| 2019/0068317 A1* | 2/2019 | Babaei ............. H04W 72/0406 |
| 2019/0090222 A1* | 3/2019 | Wu ...................... H04W 72/042 |
| 2019/0104006 A1* | 4/2019 | Wang .................... H04L 5/0025 |
| 2019/0104520 A1 | 4/2019 | Kim et al. |
| 2019/0230549 A1* | 7/2019 | Wang ................... H04B 7/0639 |
| 2019/0253300 A1* | 8/2019 | Munier ............... H04L 27/2666 |
| 2019/0260525 A1* | 8/2019 | Solano ................. H04L 5/0007 |
| 2019/0268934 A1* | 8/2019 | Korhonen ............. H04L 5/0094 |
| 2019/0372741 A1* | 12/2019 | Kazmi ................... H04W 4/70 |

* cited by examiner

DEMODULATION REFERENCE SIGNAL TRANSMISSION

CROSS REFERENCES

The present Application for Patent claims the benefit of U.S. Provisional Patent Application No. 62/586,161 by HOSSEINI, et al., entitled "DEMODULATION REFERENCE SIGNAL TRANSMISSION FOR LOW LATENCY SYSTEMS," filed Nov. 14, 2017, assigned to the assignee hereof, and expressly incorporated herein.

BACKGROUND

The following relates generally to wireless communication, and more specifically to demodulation reference signal transmission for low latency systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems (e.g., NR systems, LTE systems, etc.) may support low latency services through the use of shortened communication intervals (e.g., shortened transmission time intervals (sTTIs), mini-slots, etc.). In conventional systems, the control signaling and reference signal transmissions that support shortened communication intervals may create significant overhead that reduces the amount of data that can be communicated via a wireless channel. Conventional systems provide for sharing of reference signals to reduce overhead, but conventional solutions are not configured to support low latency communications.

SUMMARY

The described techniques relate to improved methods, systems, devices, or apparatuses that support demodulation reference signal transmission for low latency systems. Generally, the described techniques provide for improved reference signal sharing techniques for low latency systems. In some examples, to support demodulation reference signal (DMRS) sharing, a DMRS that is scheduled to be communicated during a given transmission time interval (TTI) may be communicated within that TTI even when a user equipment or base station lack data to transmit.

Some wireless systems may support resource scheduling which follows a certain periodicity (e.g., which may be referred to as semi-static scheduling, semi-persistent scheduling (SPS), etc.). For example, a base station may configure a UE with resources for uplink and/or downlink communications which occur with a given periodicity (rather than scheduling each set of resources individually). Such scheduling may, for example, reduce overhead of a system that supports low latency communications. Signaling overhead may be further reduced through the use of reference signal sharing, by which a reference signal (e.g., a demodulation reference signal (DMRS)) is shared across multiple shortened communication periods (e.g., rather than being transmitted for each communication period). However, in at least some cases, a transmitting device (e.g., a base station or a UE) may not have any data to transmit in some of the periodically occurring resources. In cases in which transmissions are not self-contained (e.g., in which the DMRS for demodulation is not included in the same sTTI), transmission skipping may be problematic. In accordance with techniques described herein, the UE may still transmit (or receive) DMRS during the periodically occurring resources (but may not transmit or receive any data). The DMRS may then still be used for demodulating data in a subsequent shortened communication period.

A method of wireless communication is described. The method may include receiving, by a UE, signaling configuring the UE to transmit a DMRS in an indicated transmission time interval (TTI) of a plurality of TTIs, the DMRS for demodulation of a data symbol transmitted in a second TTI of the plurality of TTIs, determining to skip a data transmission in the indicated TTI, and transmitting the DMRS in the indicated TTI and the data symbol in the second TTI.

An apparatus for wireless communication is described. The apparatus may include means for receiving, by a UE, signaling configuring the UE to transmit a DMRS in an indicated TTI of a plurality of TTIs, the DMRS for demodulation of a data symbol transmitted in a second TTI of the plurality of TTIs, means for determining to skip a data transmission in the indicated TTI, and means for transmitting the DMRS in the indicated TTI and the data symbol in the second TTI.

Another apparatus for wireless communication is described. The apparatus may include a processor, memory in electronic communication with the processor, and instructions stored in the memory. The instructions may be operable to cause the processor to receive, by a UE, signaling configuring the UE to transmit a DMRS in an indicated TTI of a plurality of TTIs, the DMRS for demodulation of a data symbol transmitted in a second TTI of the plurality of TTIs, determine to skip a data transmission in the indicated TTI, and transmit the DMRS in the indicated TTI and the data symbol in the second TTI.

A non-transitory computer-readable medium for wireless communication is described. The non-transitory computer-readable medium may include instructions operable to cause a processor to receive, by a UE, signaling configuring the UE to transmit a DMRS in an indicated TTI of a plurality of TTIs, the DMRS for demodulation of a data symbol transmitted in a second TTI of the plurality of TTIs, determine to skip a data transmission in the indicated TTI, and transmit the DMRS in the indicated TTI and the data symbol in the second TTI.

A method of wireless communication is described. The method may include transmitting signaling scheduling a UE on a plurality of TTIs and an indicator indicating presence of a DMRS in an indicated TTI of the plurality of TTIs, the DMRS for demodulation of a data symbol communicated in a second TTI of the plurality of TTIs, determining to skip a downlink data transmission to the UE in the indicated TTI, and transmitting the DMRS in the indicated TTI and the data symbol in the second TTI.

An apparatus for wireless communication is described. The apparatus may include means for transmitting signaling scheduling a UE on a plurality of TTIs and an indicator indicating presence of a DMRS in an indicated TTI of the plurality of TTIs, the DMRS for demodulation of a data symbol communicated in a second TTI of the plurality of TTIs, means for determining to skip a downlink data transmission to the UE in the indicated TTI, and means for transmitting the DMRS in the indicated TTI and the data symbol in the second TTI.

Another apparatus for wireless communication is described. The apparatus may include a processor, memory in electronic communication with the processor, and instructions stored in the memory. The instructions may be operable to cause the processor to transmit signaling scheduling a UE on a plurality of TTIs and an indicator indicating presence of a DMRS in an indicated TTI of the plurality of TTIs, the DMRS for demodulation of a data symbol communicated in a second TTI of the plurality of TTIs, determine to skip a downlink data transmission to the UE in the indicated TTI, and transmit the DMRS in the indicated TTI and the data symbol in the second TTI.

A non-transitory computer-readable medium for wireless communication is described. The non-transitory computer-readable medium may include instructions operable to cause a processor to transmit signaling scheduling a UE on a plurality of TTIs and an indicator indicating presence of a DMRS in an indicated TTI of the plurality of TTIs, the DMRS for demodulation of a data symbol communicated in a second TTI of the plurality of TTIs, determine to skip a downlink data transmission to the UE in the indicated TTI, and transmit the DMRS in the indicated TTI and the data symbol in the second TTI.

DETAILED DESCRIPTION

Figure 1:
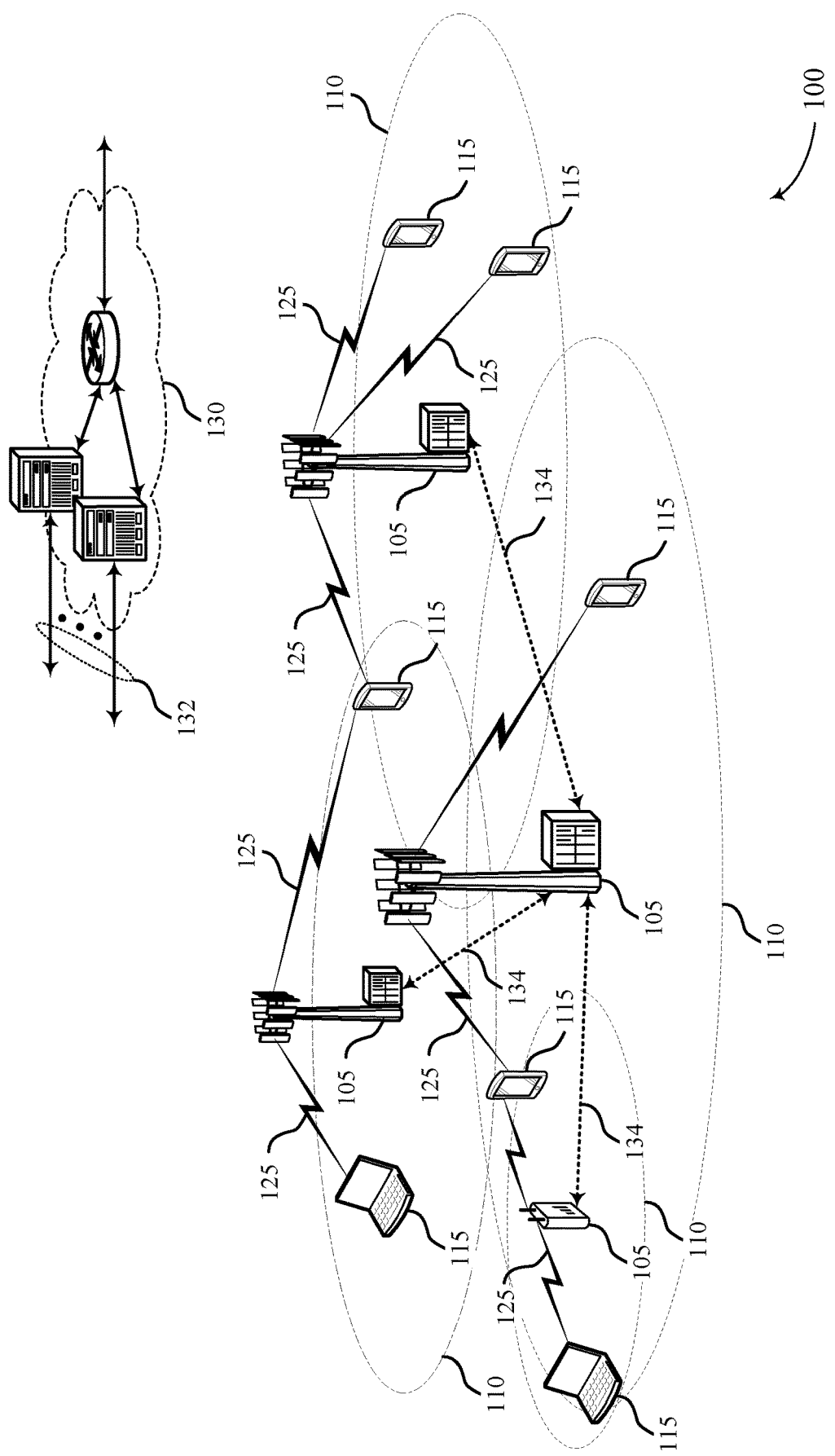
FIG. 1 illustrates an example of a wireless communications system that supports demodulation reference signal transmission for low latency systems in accordance with aspects of the present disclosure.

The described techniques relate to improved methods, systems, devices, or apparatuses that support reference signal sharing techniques for low latency systems. Generally, the described techniques provide for signaling configuring a UE to transmit (or receive) a demodulation reference signal (DMRS) in an indicated transmission time interval (TTI) of a plurality of TTIs, where the DMRS is used for demodulation of a data symbol transmitted in a second TTI of the plurality of TTIs. In some examples, a base station or a UE may determine to skip a data transmission in the indicated TTI based on whether the transmission is in the uplink or downlink direction. In some cases, the base station or the UE may then transmit the DMRS in the indicated TTI and the data symbol in the second TTI.

Some wireless communications systems may support low latency communications or may otherwise benefit from techniques which reduce signaling overhead (which may in turn increase throughput for the system or provide other benefits). In some examples, to support demodulation reference signal (DMRS) sharing, a DMRS that is scheduled to be communicated during a given transmission time interval (TTI) may be communicated within that TTI even when a user equipment or base station lack data to transmit. Low latency communications may provide for shortened communication periods (which may be referred to as sTTIs in aspects of the present disclosure, but which may also include mini-slots or other such time intervals). While the shortened communication periods may support lower latency communications, they may in some cases be associated with increased signaling overhead (which may mitigate the benefits provided by the latency reductions). By way of example, a shortened communication period may last two OFDM symbols. Using one OFDM symbol of each shortened communication period for DMRS transmission (e.g., to provide a self-contained transmission) may result in only half of the available resources being used for data transmission. To address such concerns, some systems may support reference signal sharing techniques by which a DMRS for a first sTTI is used to demodulate data in the first sTTI and at least a second sTTI.

For example, some such systems may support the sharing of information (e.g., reference signals) across multiple shortened communication intervals. By way of example, for downlink transmissions there may be a reference signal indication field in a downlink control information (DCI) transmission for a given sTTI which indicates whether a demodulation reference signal (DMRS) is included in the given sTTI or whether a DMRS is to be used from a previous sTTI. Similarly, in the uplink, there may be a field in the DCI for a given sTTI to indicate an uplink transmission pattern (e.g., the number of data and DMRS symbols and their locations within the given sTTI). In each case, a receiving device may demodulate data in some sTTIs based at least in part on DMRS received in other sTTIs (or mini-slots). That is, demodulating data in some sTTIs may rely on the presence of DMRS in other locations. Efficient techniques for transmitting reference signals within an sTTI may be desirable to reduce overhead in a wireless communications system. Accordingly, improved techniques described herein support low latency communications that efficiently utilize signaling overhead.

In some cases, a UE may be scheduled to send an uplink transmission or receive a downlink transmission based at least in part on a transmission pattern (which may indicate a number and location of data symbols and reference symbols within the scheduled resources). For example, the transmission pattern may be based on SPS or may be otherwise semi-statically indicated to the UE (or may be indicated in a DCI transmission, etc.). In some such cases, a UE might be allocated resources but may not have any data to transmit (or may not receive any data). Additionally or alternatively, a transmitting device may consider other factors when determining whether to use the allocated resources for data transmissions (e.g., whether to yield to another device with a higher priority, whether interference is high, whether channel conditions are poor, etc.). In accordance with aspects of the present disclosure, a transmitting device (e.g., a UE or a base station) may identify a condition under which data is not to be transmitted within a given sTTI, but may still transmit a reference signal within the given sTTI (e.g., because the reference signal may be used to support demodulation of data in another sTTI which may still be used to communicate data). Considerations for reference signal sharing in low latency systems are discussed further below.

Aspects of the disclosure are initially described in the context of a wireless communications system. Aspects of the disclosure are then described with reference to resource configurations and process flow diagrams. Aspects of the disclosure are further illustrated by and described with reference to apparatus diagrams, system diagrams, and flowcharts that relate to demodulation reference signal transmission for low latency systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-A network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these.

Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of sTTIs or in selected component carriers using sTTIs). Examples of sTTI durations include a one-slot sTTI, a two-symbol sTTI, a three-symbol sTTI, etc.

A base station 105 may transmit system information, which UEs 115 may use to access a wireless network (e.g., through the base station 105). The UEs 115 may also receive timing information to synchronize with the base station 105. Synchronization (e.g., for cell acquisition) may be performed using synchronization signals or channels transmitted by a synchronization source (e.g., the base station 105). Synchronization signals may include PSS or SSS. The UEs 115 attempting to access a wireless network may perform an initial cell search by detecting a PSS from the base station 105. The PSS may enable synchronization of slot timing or symbol timing. The UEs 115 may then receive an SSS.

The SSS may enable radio frame synchronization, and may provide a cell ID value, which may be combined with the physical layer identity value to form the physical cell identifier (PCID), which identifies the cell. The SSS may also enable detection of a duplexing mode (e.g., TDD or FDD). An SSS may be used to acquire other broadcast information (e.g., system bandwidth). In some cases, the base station 105 may provide the other broadcast information for the UEs 115 in the PBCH. As such, the PBCH may be used to acquire additional broadcast information needed for acquisition (e.g., system bandwidth, radio frame index/number). In some examples, the PBCH may be multiplexed on a carrier according to various techniques. A PBCH and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a PBCH may be distributed between different control regions in a cascaded manner (e.g., between a common control region or common search space and one or more UE-specific control regions or UE-specific search spaces).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described herein, a base station 105 in wireless communications system 100 may support efficient techniques for transmitting reference signals to a UE 115 with reduced signaling overhead. Similarly, a UE 115 within wireless communications system 100 may support efficient techniques for performing channel estimation using reference signals received in multiple sTTIs to improve the accuracy and reliability of a channel estimate used to demodulate data in an sTTI. Analogous techniques may be performed by a base station 105 and UE 115 in an uplink direction (e.g., in which the UE 115 transmits data and the base station 105 receives the data). In some aspects, a base station 105 may transmit reference signals in some of the sTTIs used for downlink communications with a UE 115, and the UE 115 may be configured to use the reference signals in these sTTIs to perform channel estimation for demodulating data in these sTTIs and others. Similarly, a base station 105 may be configured to perform channel estimation for demodulating data in an sTTI using reference signals received in another sTTI. In some examples, an sTTI may carry reference signals but may not carry data. Thus, a transmitting device (e.g., a UE 115 or a base station 105) may determine not to transmit data in a given sTTI (e.g., based on a lack of data or some other factors) but may still transmit reference signals in the sTTI. These reference signals may then be used to demodulate data in a subsequent sTTI.

Figure 2:
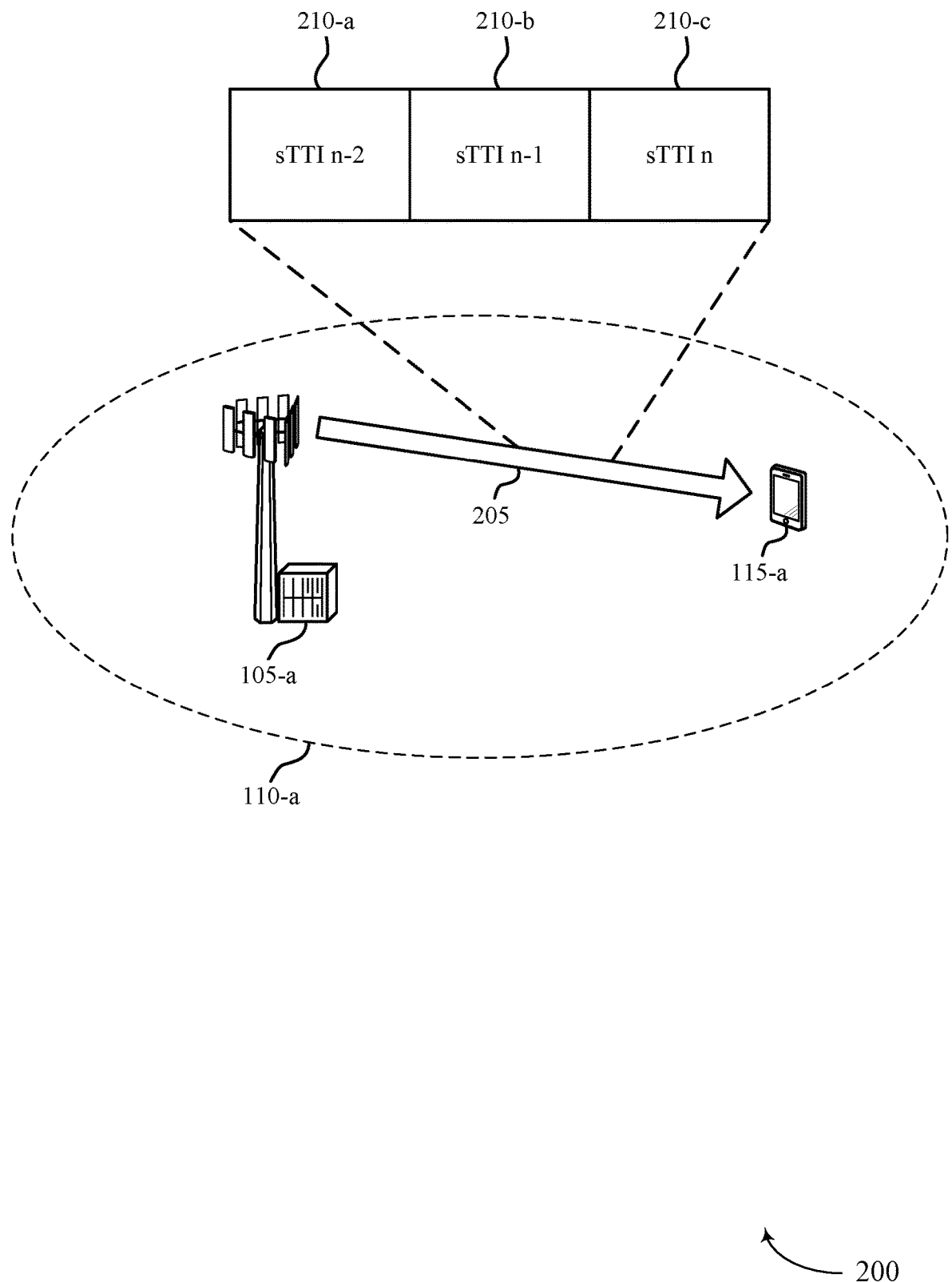
FIG. 2 illustrates an example of a wireless communications system that supports demodulation reference signal transmission for low latency systems in accordance with aspects of the present disclosure.

FIG. 2 illustrates an example of a wireless communications system 200 that supports demodulation reference signal transmission for low latency systems in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. Wireless communications system 200 may implement aspects of wireless communications system 100. For example, base station 105-a may communicate with UE 115-a during sTTIs 210 on resources of the carrier 205.

Base station 105-a may transmit control information to UE 115-a in a shortened physical downlink control channel (sPDCCH) in an sTTI 210, and base station 105-a may transmit data to UE 115-a in an sPDSCH in the sTTI 210. In some cases, base station 105-a may also transmit DMRS to UE 115-a in the sTTI 210 to allow UE 115-a to perform channel estimation for demodulating the data in the sTTI 210 (e.g., demodulate one or more data symbols). Using the techniques described herein, base station 105-a may transmit the DMRS in some of the sTTIs 210 used for downlink communications with UE 115-a, and UE 115-a may use these DMRS to perform channel estimation for demodulating data in these sTTIs 210 and other sTTIs 210.

In some cases, UE 115-a may receive an indication to use DMRS received in a current sTTI, DMRS received in an sTTI immediately preceding the current sTTI, or both to perform channel estimation for demodulating data received in the current sTTI. That is, UE 115-*a* may be configured with a DMRS sharing window size of two. In one example, UE 115-*a* may receive DMRS in sTTI 210-*b*, and UE 115-*a* may not receive DMRS in sTTI 210-*c*. In this example, UE 115-*a* may use the DMRS received in sTTI 210-*b* to perform channel estimation for demodulating data received in sTTI 210-*c*. In another example, UE 115-*a* may receive DMRS in sTTI 210-*b* and sTTI 210-*c*. In this example, UE 115-*a* may perform channel estimation for demodulating data received in sTTI 210-*c* using the DMRS received in sTTI 210-*c* in combination with the DMRS received in sTTI 210-*b*. Analogous DMRS sharing may be performed in an uplink direction.

By way of example, in the downlink direction UE 115-*a* may be configured (e.g., via RRC signaling) to receive DMRS in only one sTTI (or mini-slot) out of a given number of consecutive sTTIs (or mini-slots) as part of a downlink SPS configuration. Once the downlink SPS is activated (e.g., via a DCI transmission), UE 115-*a* may expect to receive DMRS in the indicated sTTIs (or mini-slots). For example, UE 115-*a* may be configured with a pattern in which sTTI 210-*a* includes DMRS, sTTI 210-*b* does not include DMRS, sTTI 210-*c* includes DMRS, etc. In such a case, starting from SPS activation, UE 115-*a* may expect to receive DMRS in odd-indexed sTTIs 210. For each even-indexed sTTI 210, the demodulation may rely on the presence of DMRS in the previous sTTI 210.

As another example, UE 115-*a* may receive a downlink grant that schedules multiple sTTIs 210 (e.g., schedules a set of mini-slots). As part of the grant, UE 115-*a* may receive an indication of the presence of DMRS over the multiple sTTIs 210 or mini-slots. For example, UE 115-*a* may receive a multi-sTTI/mini-slot grant in sTTI 210-*a* that schedules four sTTIs 210. In some cases, UE 115-*a* may also receive an indication that only sTTI 210-*a* includes DMRS. The remaining three sTTIs 210 may then rely on the presence of the DMRS in sTTI 210-*a*. Analogous procedures may be performed in the uplink direction. For example, UE 115-*a* may receive an uplink pattern indicating a number and location of DMRS symbols as part of an SPS configuration. UE 115-*a* may begin transmitting during an sTTI 210 which is activated by the uplink SPS configuration (e.g., under SPS operation, UE 115-*a* may be configured with an uplink pattern that spans) multiple sTTIs/mini-slots.

Because not all sTTIs 210 in the SPS configuration include DMRS, demodulation of at least some of the sTTIs 210 may rely on the presence of DMRS in one or more neighboring sTTIs 210. For example, UE 115-*a* may be configured with [R,D] and [D,D] across two consecutive sTTIs in which 'R' indicates a DMRS symbol and 'D' indicates a data symbol. In an example, UE 115-*a* may receive a grant instructing the UE 115-*a* to transmit using a first uplink pattern [D,D|R] in a first sTTI, where R is to be transmitted in an adjacent, second sTTI, and transmit using a second uplink pattern [R,D] in the second sTTI. In this example, the DMRS R in the first uplink pattern and the second uplink pattern both indicate a same symbol period in the second sTTI (e.g., the first symbol period), and hence DMRS R may be the same transmission in the second sTTI. Even if the UE 115-*a* determines not to transmit data D in the second sTTI, the UE 115-*a* still transmits R in the second sTTI. In another example, UE 115-*a* may be configured with a given pattern that spans over 6 UL sTTIs, wherein the DMRS for demodulating some of the UL sTTIs is sent in other sTTIs (e.g., DMRS sharing is employed.).

Figure 3:
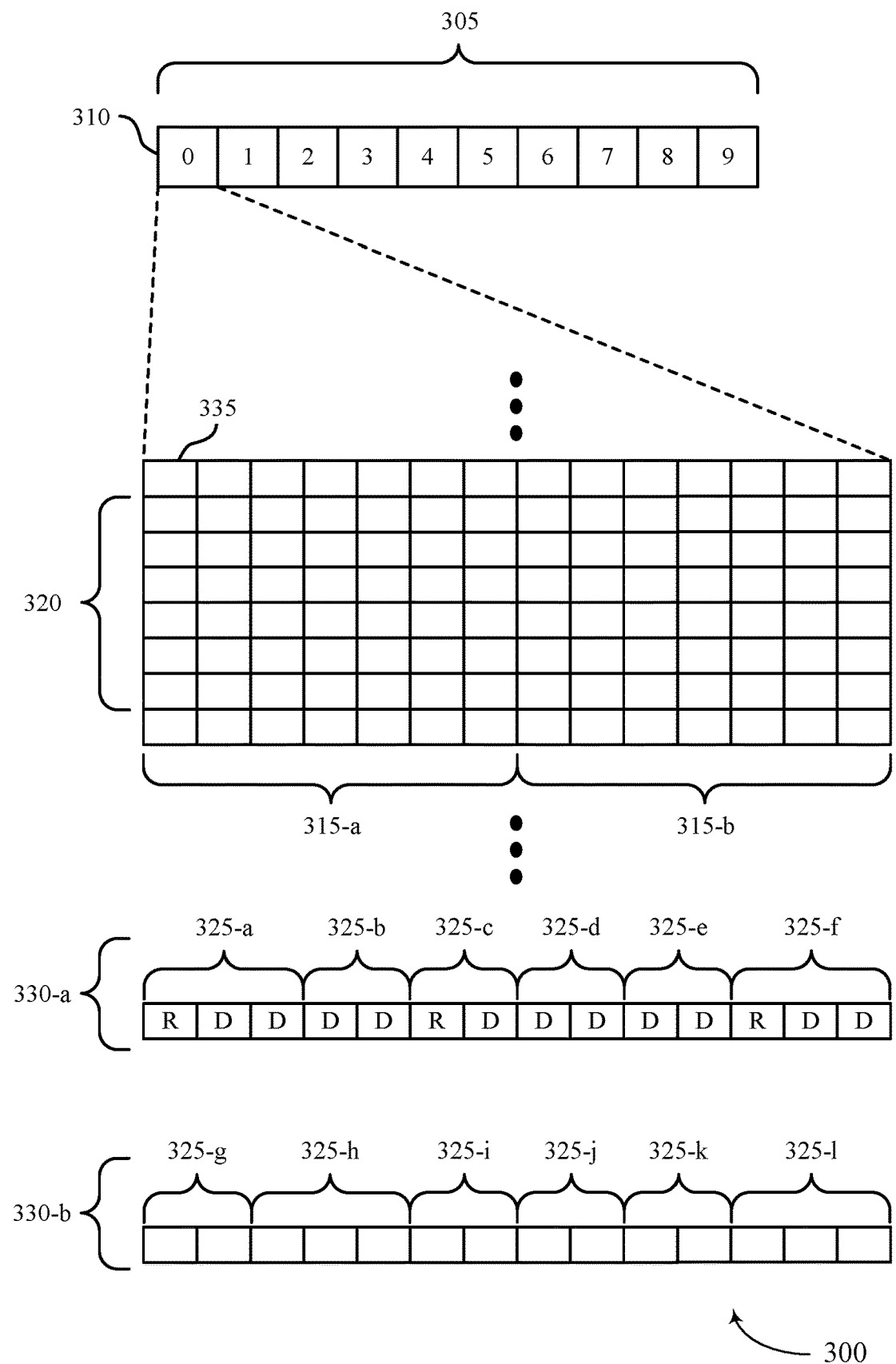
FIG. 3 illustrates an example of a resource configuration that supports demodulation reference signal transmission for low latency systems in accordance with aspects of the present disclosure.

FIG. 3 illustrates an example of a resource configuration 300 that supports demodulation reference signal transmission for low latency systems in accordance with various aspects of the present disclosure. Resource configuration 300 may be applicable to a UE 115 or a base station 105 as described herein and may implement aspects of wireless communications system 100 and wireless communications system 200. Resource configuration 300 illustrates a radio frame 305 comprising ten subframes 310 (numbered '0' through '9'). As discussed above, each subframe 310 may contain two slots 315-*a* and 315-*b*, each of which spans seven symbol periods in the present example. Additionally, each subframe 310 may be divided in frequency into subcarriers. For the sake of explanation, resource configuration 300 illustrates an organization of blocks 335, where each block 335 spans a single symbol period in time and twelve subcarriers in frequency. Accordingly, the seven blocks 335 in the first row of slot 315-*a* may be referred to as a resource block.

Various resource patterns 330 may be realized in a given subframe 310 to support sTTI communications. In an example, each resource pattern 330 includes four two-symbol sTTIs 325 and two three-symbol sTTIs 325. In some cases, the first sTTI 325 of each resource pattern 330 (i.e., sTTI 325-*a* for resource pattern 330-*a* and sTTI 325-*g* for resource pattern 330-*b*) may contain control information. In some cases, a subset of sTTI 325-*a* (e.g., only the first symbol period) may contain the control information while the remaining two symbol periods may be allocated for data transmissions.

Aspects of the following are described with reference to resource pattern 330-*a*, though it is to be understood that the described techniques may equally apply to resource pattern 330-*b*. As described with reference to FIG. 2, DMRS may in some cases be shared across consecutive sTTIs 325. For example, if DMRS is sent in the first symbol of sTTI 325-*a* (as indicated by 'R'), a UE 115 may receive an indication in sTTI 325-*b* to reuse the DMRS from sTTI 325-*a*. It is to be understood that the pattern illustrated with reference to resource pattern 330-*a* (in which 'R' indicates a DMRS symbol and 'D' indicates a data symbol) is included for the sake of explanation and is not limiting of scope; other patterns are considered.

In the various examples discussed above, because the pattern (for uplink transmission) or the presence/absence of DMRS (in the downlink) may be indicated to a UE 115 only once (i.e., the decision does not change in between indications), if the UE 115 decides to skip the uplink transmission completely in a given sTTI (e.g., or the base station 105 decides to skip the downlink transmission completely), DMRS sharing may be problematic (e.g., in cases in which either the UE 115 or base station 105 decides to skip transmission over an sTTI 325 that includes DMRS). In accordance with aspects of the present disclosure, when DMRS sharing is employed across sTTIs 325, once the UE 115 or base station 105 decides to skip the uplink or downlink transmission over an sTTI 325 (or mini-slot) that is supposed to include DMRS, the DMRS may still be sent. That is, the base station 105 or UE 115 may only skip the transmission of the data, and still transmit DMRS in the given sTTI 325. As an example, if the UE 115 is configured to use resource pattern 330-*a* (and the SPS configuration is activated beginning with sTTI 325-*c*), in cases in which there is no data to be sent over sTTI 325-*c*, the UE 115 may still send DMRS in the first symbol of sTTI 325-*c* (but may not send anything in the second symbol of sTTI 325-*c*).

Figure 4:
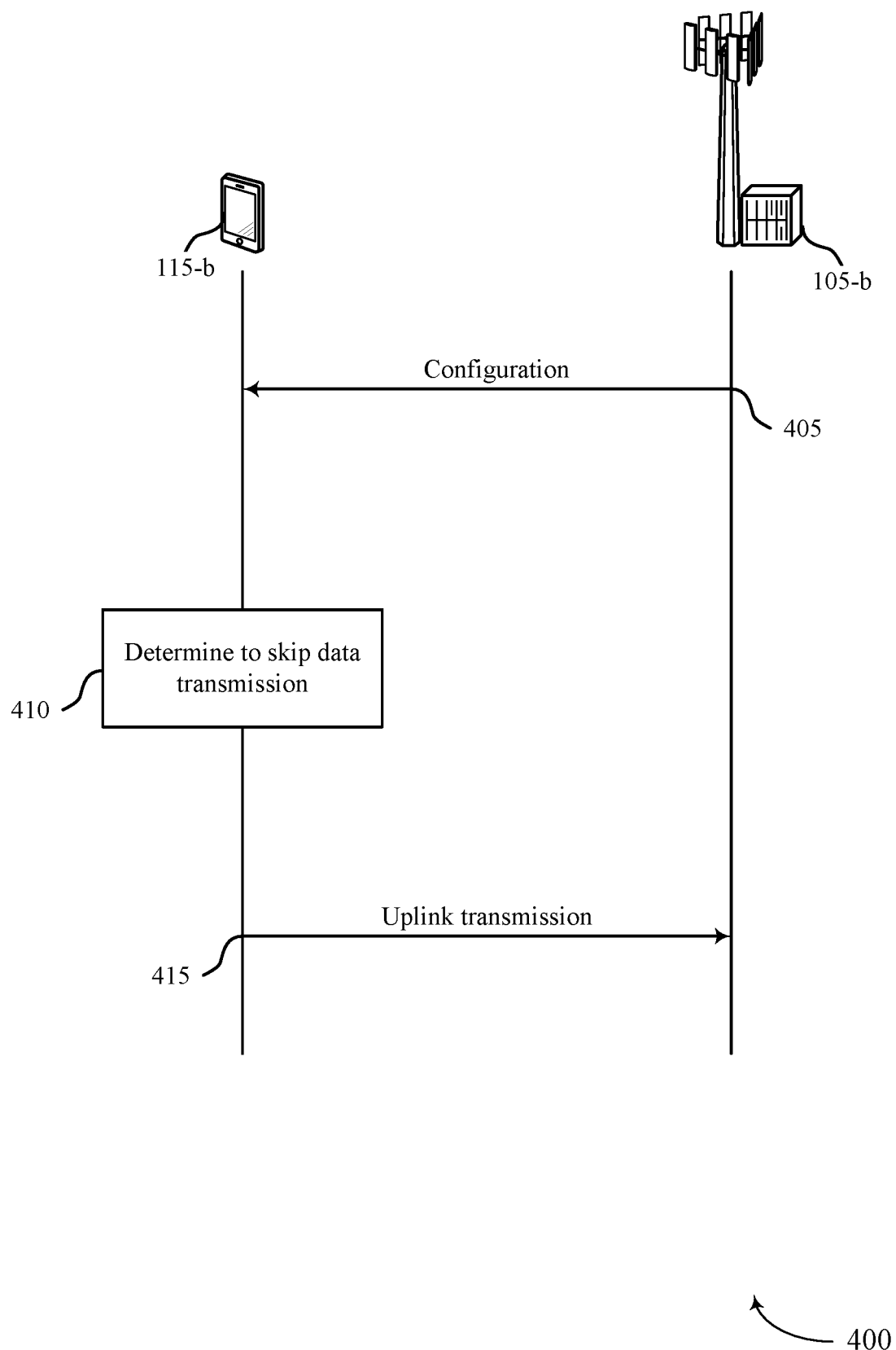
FIG. 4 illustrates an example of a process flow that supports demodulation reference signal transmission for low latency systems in accordance with aspects of the present disclosure.

FIG. 4 illustrates an example of a process flow 400 that supports demodulation reference signal transmission for low latency systems in accordance with various aspects of the present disclosure. In some examples, process flow 400 may implement aspects of wireless communications system 100 and wireless communications system 200. For example, process flow 400 includes base station 105-*b* and UE 115-*b*, each of which may be an example of the corresponding device described with reference to FIGS. 1 and 2.

At 405, base station 105-*b* may transmit (and UE 115-*b* may receive) signaling configuring UE 115-*b* to transmit a DMRS in an indicated TTI of a plurality of TTIs, where the DMRS is used for demodulation of a data symbol transmitted in a second TTI of the plurality of TTIs. For example, the signaling may be RRC signaling configuring UE 115-*b* with a given resource pattern (e.g., as described with reference to FIG. 3). In some cases, UE 115-*b* may process the signaling to determine a SPS configuration indicating the given resource pattern, which identifies in which one or more symbol periods within the plurality of TTIs UE 115-*b* is configured to transmit the DMRS and in which one or more symbol periods within the plurality of TTIs UE 115-*b* is allocated resources to transmit a data symbol.

In some cases, UE 115-*b* may process the signaling to identify that it is allocated resources to transmit a plurality of data symbols including the data symbol in the second TTI (e.g., to identify that the second TTI includes a plurality of data symbols). In some cases, receiving the signaling includes receiving a grant (e.g., a DCI grant scheduling multiple TTIs) that allocates resources to UE 115-*b* in the plurality of TTIs and an indicator that only the indicated TTI of the plurality of TTIs is to include the DMRS. In some cases, UE 115-*b* may process the signaling to identify an activation identifier that identifies a starting TTI of the plurality of TTIs (e.g., for the case of SPS scheduling).

At 410, UE 115-*b* may determine to skip a data transmission in the TTI indicated in the signaling received at 405. For example, the determination to skip the data transmission may be based on a lack of data to transmit, poor channel conditions, high interference, etc.

At 415, UE 115-*b* may transmit an uplink transmission comprising DMRS in the indicated TTI and the data symbol in the second TTI. For example, transmitting the DMRS in the indicated TTI may include transmitting the DMRS in an indicated symbol period of a plurality of symbol periods of the indicated TTI and determining not to transmit in any of a remaining one or more symbol periods of the plurality of symbol periods of the indicated TTI. Because the DMRS is transmitted even when data is not being transmitted in a particular sTTI, DMRS sharing may still be implemented.

Figure 5:
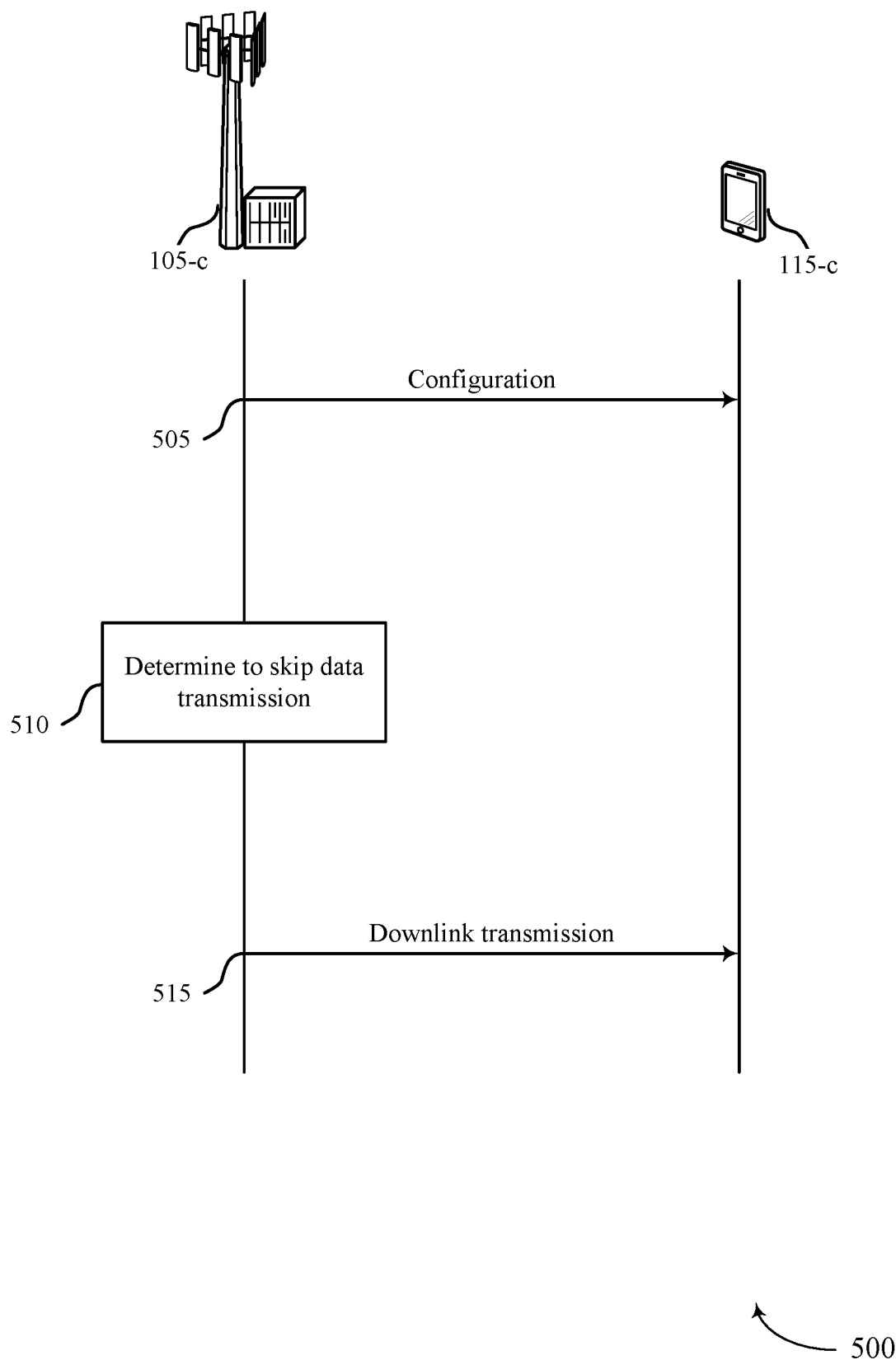
FIG. 5 illustrates an example of a process flow that supports demodulation reference signal transmission for low latency systems in accordance with aspects of the present disclosure.

FIG. 5 illustrates an example of a process flow 500 that supports demodulation reference signal transmission for low latency systems in accordance with various aspects of the present disclosure. In some examples, process flow 500 may implement aspects of wireless communications system 100 and wireless communications system 200. For example, process flow 500 includes base station 105-*c* and UE 115-*c*, each of which may be an example of the corresponding device described with reference to FIGS. 1 and 2.

At 505, base station 105-*c* may transmit (and UE 115-*c* may receive) signaling scheduling UE 115-*c* on a plurality of TTIs and an indicator indicating a presence of a DMRS in an indicated TTI of the plurality of TTIs, where the DMRS is used for demodulation of a data symbol communicated in a second TTI of the plurality of TTIs. In some cases, base station 105-*c* may generate the indicator to indicate a presence of the DMRS in at least a second TTI of the plurality of TTIs. Additionally or alternatively, base station 105-*c* may generate the signaling to indicate a SPS configuration that identifies a periodicity at which the plurality of TTIs repeats within a larger set of TTIs. In some cases, the indicator is transmitted via DCI. In some examples, the signaling is transmitted vis RRC.

At 510, base station 105-*c* may determine to skip a data transmission. For example, the determination to skip the data transmission may be based on a lack of data to transmit, poor channel conditions, high interference, etc.

At 515, base station 105-*c* may transmit a downlink transmission in the TTI indicated in the signaling at 505 and may transmit the data symbol in the second TTI. In some cases, transmitting the DMRS in the indicated TTI includes transmitting the DMRS in an indicated symbol period of a plurality of symbol periods of the indicated TTI and determining not to transmit in any of a remaining one or more symbol periods of the plurality of symbol periods of the indicated TTI.

Figure 6:
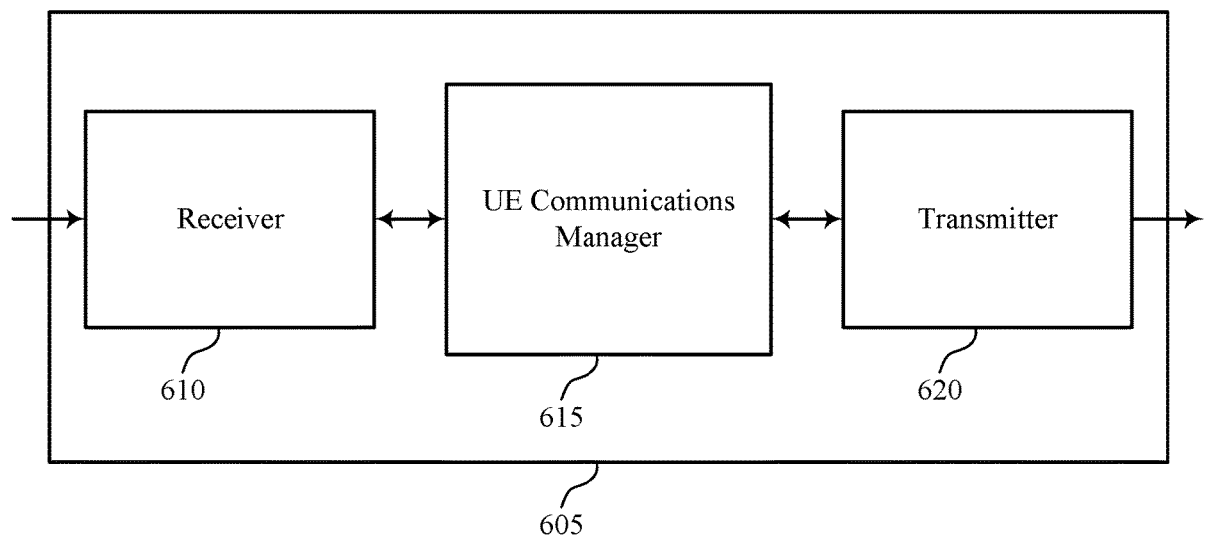
FIGS. 6 through 8 show block diagrams of a device that supports demodulation reference signal transmission for low latency systems in accordance with aspects of the present disclosure.

FIG. 6 shows a block diagram 600 of a wireless device 605 that supports demodulation reference signal transmission for low latency systems in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to demodulation reference signal transmission for low latency systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive signaling configuring the UE to transmit a DMRS in an indicated TTI of a set of TTIs, the DMRS for demodulation of a data symbol transmitted in a second TTI of the set of TTIs. UE communications manager 615 may determine to skip a data transmission in the indicated TTI. UE communications manager 615 may transmit the DMRS in the indicated TTI and the data symbol in the second TTI.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
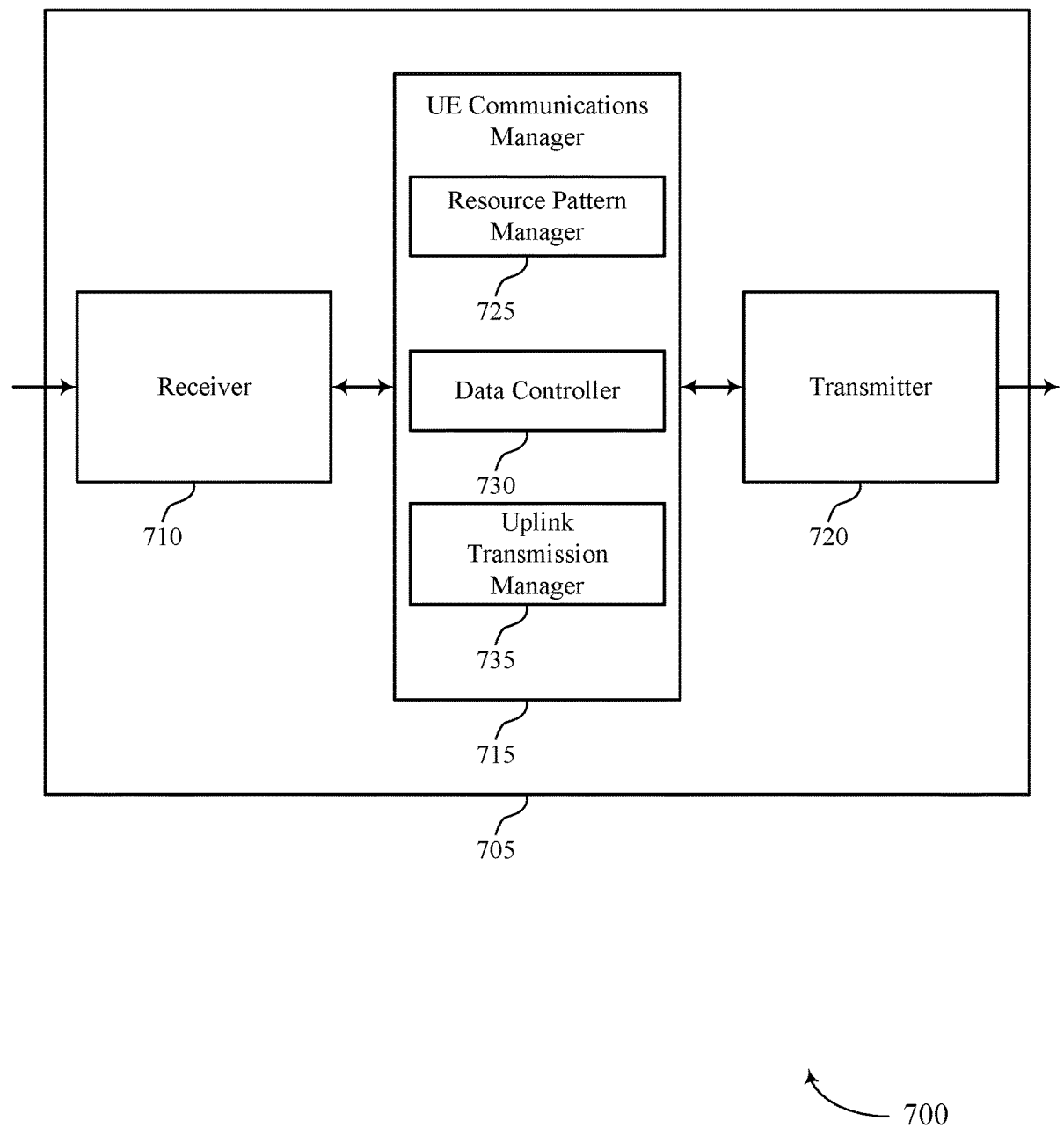

FIG. 7 shows a block diagram 700 of a wireless device 705 that supports demodulation reference signal transmission for low latency systems in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to demodulation reference signal transmission for low latency systems, etc.). Information may be passed on to other components of the device. The receiver 710 may be an example of aspects of the transceiver 935 described with reference to FIG. 9. The receiver 710 may utilize a single antenna or a set of antennas. UE communications manager 715 may be an example of aspects of the UE communications manager 915 described with reference to FIG. 9. UE communications manager 715 may also include resource pattern manager 725, data controller 730, and uplink transmission manager 735.

Resource pattern manager 725 may receive signaling configuring the UE to transmit a DMRS in an indicated TTI of a set of TTIs, the DMRS for demodulation of a data symbol transmitted in a second TTI of the set of TTIs. Resource pattern manager 725 may process the signaling to determine a SPS configuration indicating an uplink transmission pattern that identifies in which one or more symbol periods within the set of TTIs the UE is configured to transmit the DMRS and in which one or more symbol periods within the set of TTIs the UE is allocated resources to transmit a data symbol. Resource pattern manager 725 may process the signaling to identify an activation identifier that identifies a starting TTI of the set of TTIs. In some cases, receiving the signaling includes receiving a grant that allocates resources to the UE in the set of TTIs and an indicator that only the indicated TTI of the set of TTIs is to include the DMRS. In some cases, the indicated TTI includes a first number of symbol periods and the second TTI includes a second number of symbol periods that differs from the first number of symbol periods. In some cases, the set of TTIs are consecutive TTIs. In some cases, each of the set of TTIs is either a two or three symbol TTI.

Data controller 730 may determine to skip a data transmission in the indicated TTI and may process the signaling configuring the UE to transmit the DMRS to identify that the UE is allocated resources to transmit a set of data symbols including the data symbol in the second TTI.

Uplink transmission manager 735 may transmit the DMRS in the indicated TTI and the data symbol in the second TTI. Uplink transmission manager 735 may determine not to transmit in any of a remaining one or more symbol periods of the set of symbol periods of the indicated TTI. In some cases, transmitting the DMRS in the indicated TTI includes transmitting the DMRS in an indicated symbol period of a set of symbol periods of the indicated TTI.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
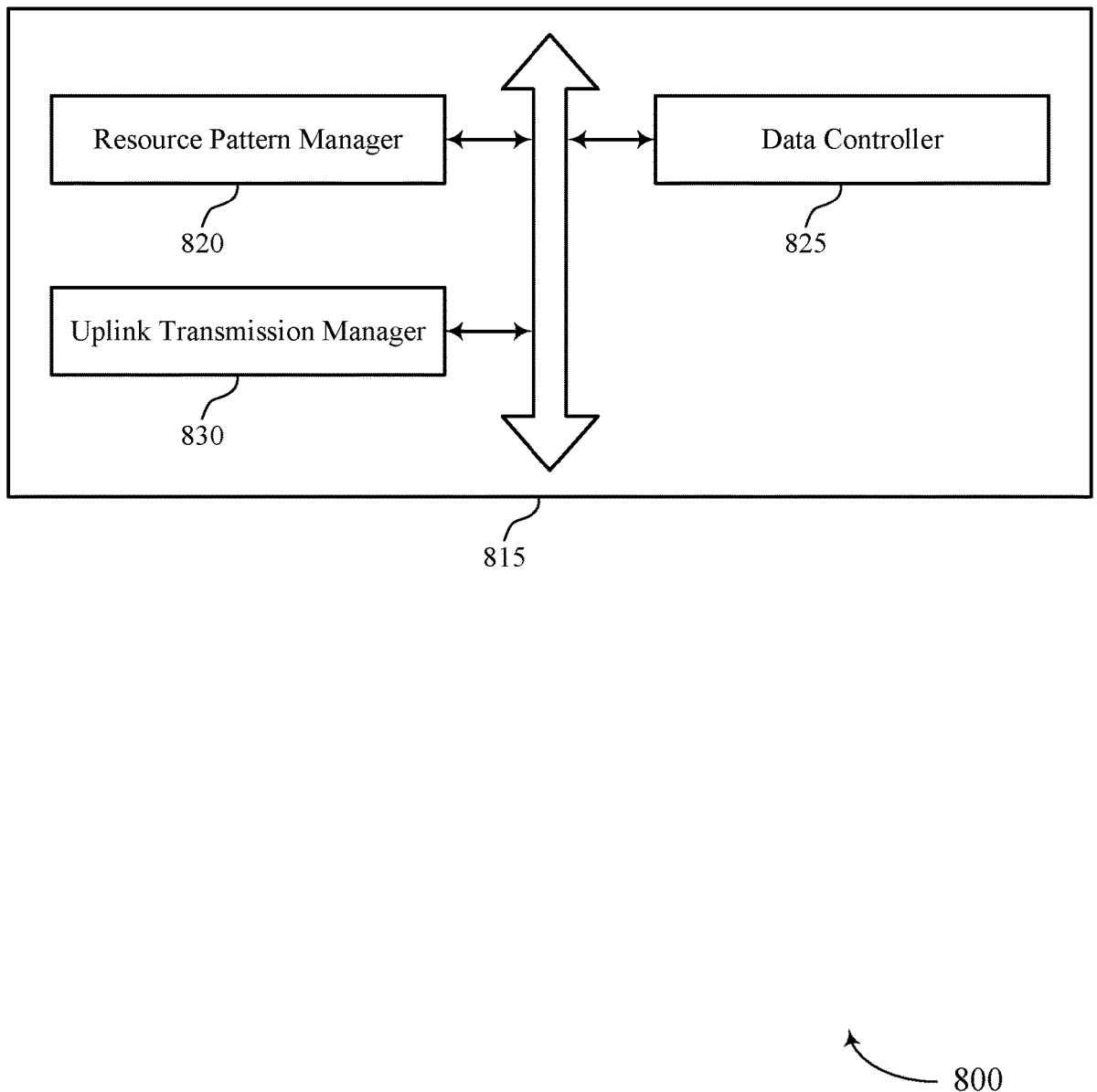

FIG. 8 shows a block diagram 800 of a UE communications manager 815 that supports demodulation reference signal transmission for low latency systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include resource pattern manager 820, data controller 825, and uplink transmission manager 830. Each of these modules may communicate, directly or indirectly, with one another (e.g., via one or more buses).

Resource pattern manager 820 may receive, by a UE, signaling configuring the UE to transmit a DMRS in an indicated TTI of a set of TTIs, the DMRS for demodulation of a data symbol transmitted in a second TTI of the set of TTIs. Resource pattern manager 820 may process the signaling to determine a SPS configuration indicating an uplink transmission pattern that identifies in which one or more symbol periods within the set of TTIs the UE is configured to transmit the DMRS and in which one or more symbol periods within the set of TTIs the UE is allocated resources to transmit a data symbol. Resource pattern manager 820 may process the signaling to identify an activation identifier that identifies a starting TTI of the set of TTIs. In some cases, receiving the signaling includes receiving a grant that allocates resources to the UE in the set of TTIs and an indicator that only the indicated TTI of the set of TTIs is to include the DMRS. In some cases, the indicated TTI includes a first number of symbol periods and the second TTI includes a second number of symbol periods that differs from the first number of symbol periods. In some cases, the set of TTIs are consecutive TTIs. In some cases, each of the set of TTIs is either a two or three symbol TTI.

Data controller 825 may determine to skip a data transmission in the indicated TTI and may process the signaling to identify that the UE is allocated resources to transmit a set of data symbols including the data symbol in the second TTI.

Uplink transmission manager 830 may transmit the DMRS in the indicated TTI and the data symbol in the second TTI. Uplink transmission manager 830 may determine not to transmit in any of a remaining one or more symbol periods of the set of symbol periods of the indicated TTI. In some cases, transmitting the DMRS in the indicated TTI includes: transmitting the DMRS in an indicated symbol period of a set of symbol periods of the indicated TTI.

In some examples of the method, apparatus, and non-transitory computer-readable medium described above, transmitting the DMRS in the indicated TTI comprises: transmitting the DMRS in an indicated symbol period of a plurality of symbol periods of the indicated TTI. Some examples of the method, apparatus, and non-transitory computer-readable medium described above may further include processes, features, means, or instructions for determining not to transmit in any of a remaining one or more symbol periods of the plurality of symbol periods of the indicated TTI.

Some examples of the method, apparatus, and non-transitory computer-readable medium described above may further include processes, features, means, or instructions for processing the signaling to determine a semi-persistent scheduling (SPS) configuration indicating an uplink transmission pattern that identifies in which one or more symbol periods within the plurality of TTIs the UE may be configured to transmit the DMRS and in which one or more symbol periods within the plurality of TTIs the UE may be allocated resources to transmit a data symbol.

Some examples of the method, apparatus, and non-transitory computer-readable medium described above may further include processes, features, means, or instructions for processing the signaling to identify that the UE may be allocated resources to transmit a plurality of data symbols including the data symbol in the second TTI.

In some examples of the method, apparatus, and non-transitory computer-readable medium described above, receiving the signaling comprises: receiving a grant that allocates resources to the UE in the plurality of TTIs and an indicator that only the indicated TTI of the plurality of TTIs may be to include the DMRS.

In some examples of the method, apparatus, and non-transitory computer-readable medium described above, the indicated TTI comprises a first number of symbol periods and the second TTI comprises a second number of symbol periods that differs from the first number of symbol periods.

In some examples of the method, apparatus, and non-transitory computer-readable medium described above, the plurality of TTIs may be consecutive TTIs.

In some examples of the method, apparatus, and non-transitory computer-readable medium described above, each of the plurality of TTIs may be either a two or three symbol TTI.

Figure 9:
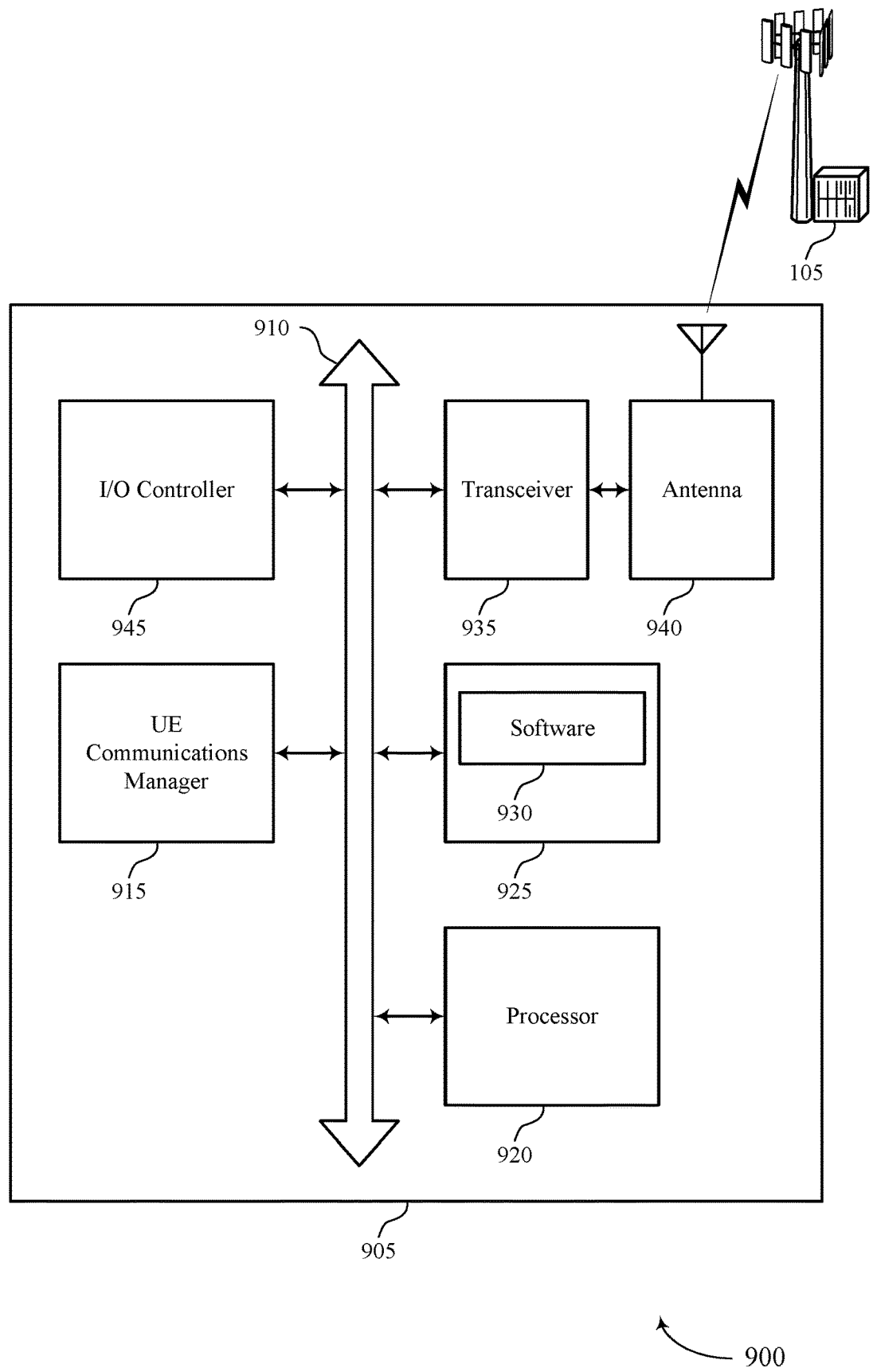
FIG. 9 illustrates a block diagram of a system including a UE that supports demodulation reference signal transmission for low latency systems in accordance with aspects of the present disclosure.

FIG. 9 shows a diagram of a system 900 including a device 905 that supports demodulation reference signal transmission for low latency systems in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting demodulation reference signal transmission for low latency systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support demodulation reference signal transmission for low latency systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
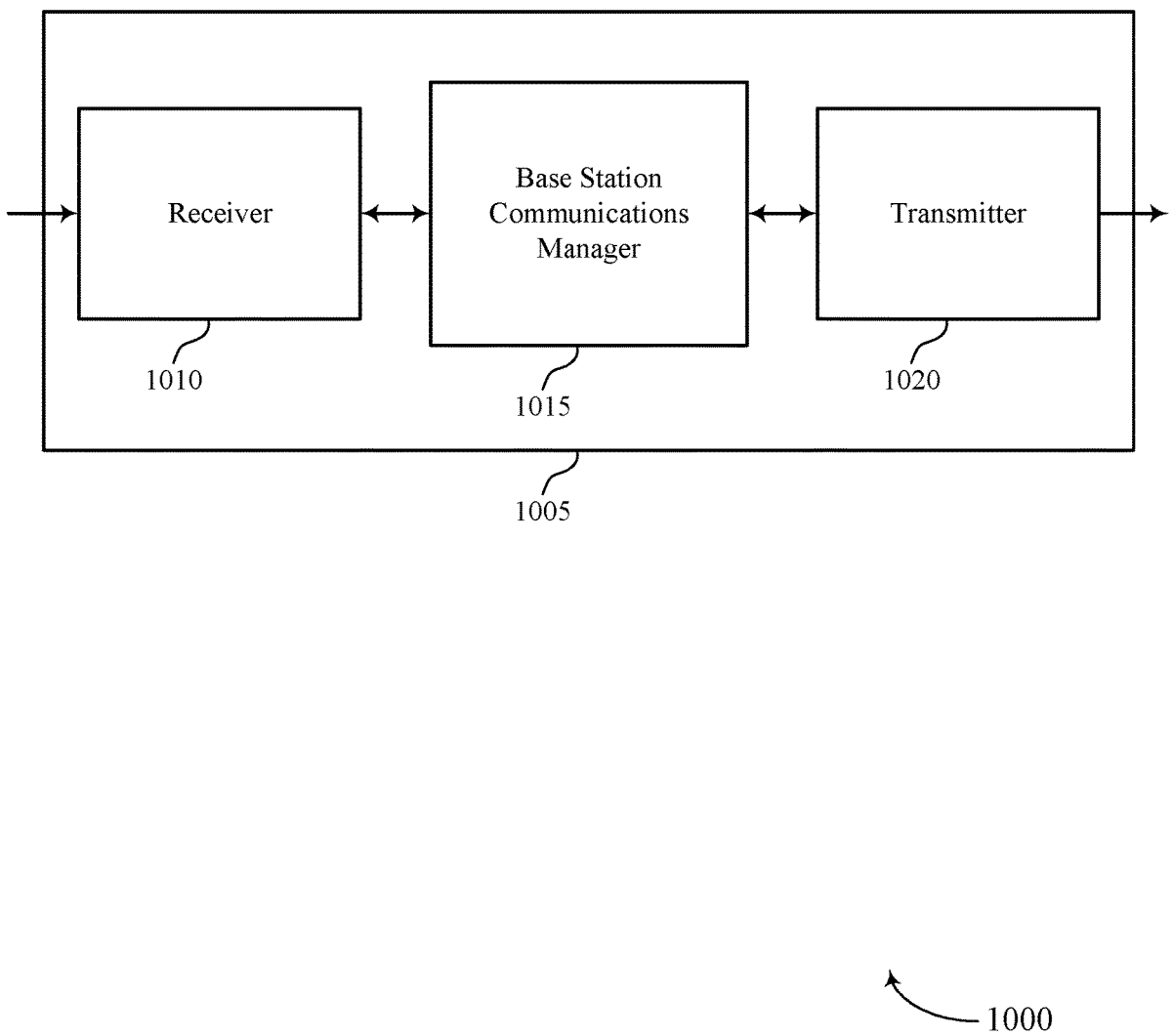
FIGS. 10 through 12 show block diagrams of a device that supports demodulation reference signal transmission for low latency systems in accordance with aspects of the present disclosure.

FIG. 10 shows a block diagram 1000 of a wireless device 1005 that supports demodulation reference signal transmission for low latency systems in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to demodulation reference signal transmission for low latency systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit signaling scheduling a UE on a set of TTIs and an indicator indicating presence of a DMRS in an indicated TTI of the set of TTIs, the DMRS for demodulation of a data symbol communicated in a second TTI of the set of TTIs. Base station communications manager 1015 may determine to skip a downlink data transmission to the UE in the indicated TTI. Base station communications manager 1015 may transmit the DMRS in the indicated TTI and the data symbol in the second TTI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
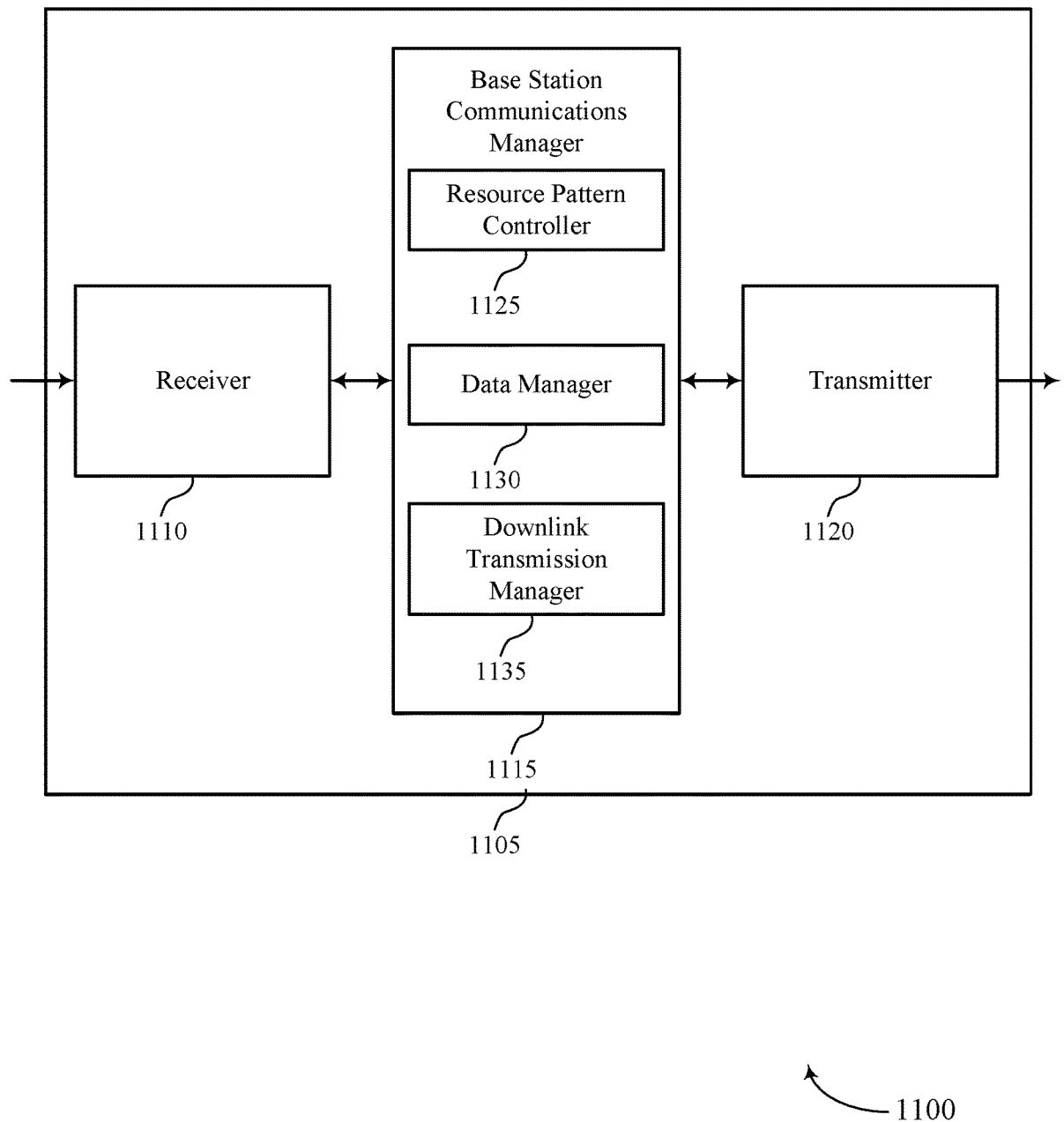

FIG. 11 shows a block diagram 1100 of a wireless device 1105 that supports demodulation reference signal transmission for low latency systems in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to demodulation reference signal transmission for low latency systems, etc.). Information may be passed on to other components of the device. The receiver 1110 may be an example of aspects of the transceiver 1335 described with reference to FIG. 13. The receiver 1110 may utilize a single antenna or a set of antennas. Base station communications manager 1115 may be an example of aspects of the base station communications manager 1315 described with reference to FIG. 13. Base station communications manager 1115 may also include resource pattern controller 1125, data manager 1130, and downlink transmission manager 1135.

Resource pattern controller 1125 may transmit signaling scheduling a UE on a set of TTIs and an indicator indicating presence of a DMRS in an indicated TTI of the set of TTIs, the DMRS for demodulation of a data symbol communicated in a second TTI of the set of TTIs. Resource pattern controller 1125 may generate the indicator to indicate presence of the DMRS in a second indicated TTI of the set of TTIs. Resource pattern controller 1125 may generate the signaling to indicate a SPS configuration that identifies a periodicity at which the set of TTIs repeats within a larger set of TTIs. In some cases, the indicated TTI includes a first number of symbol periods and the second TTI includes a second number of symbol periods that differs from the first number of symbol periods. In some cases, transmitting the indicator includes transmitting the indicator in DCI. In some cases, transmitting the signaling includes: transmitting the signaling in RRC signaling. In some cases, the set of TTIs are consecutive TTIs. In some cases, each of the set of TTIs is either a two or three symbol TTI.

Data manager 1130 may determine to skip a downlink data transmission to the UE in the indicated TTI. Downlink transmission manager 1135 may transmit the DMRS in the indicated TTI and the data symbol in the second TTI. Downlink transmission manager 1135 may determine not to transmit data in any of a remaining one or more symbol periods of the set of symbol periods of the indicated TTI (e.g., but may still transmit DMRS in some of the remaining one or more symbol periods). That is, in some cases, downlink transmissions may support multiplexing of data and DMRS within a single symbol period. In such cases (e.g., in which there is no data to transmit or a determination is otherwise made not to transmit data), DMRS may still be transmitted in the symbol period. In some cases, transmitting the DMRS in the indicated TTI includes transmitting the DMRS in an indicated symbol period of a set of symbol periods of the indicated TTI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
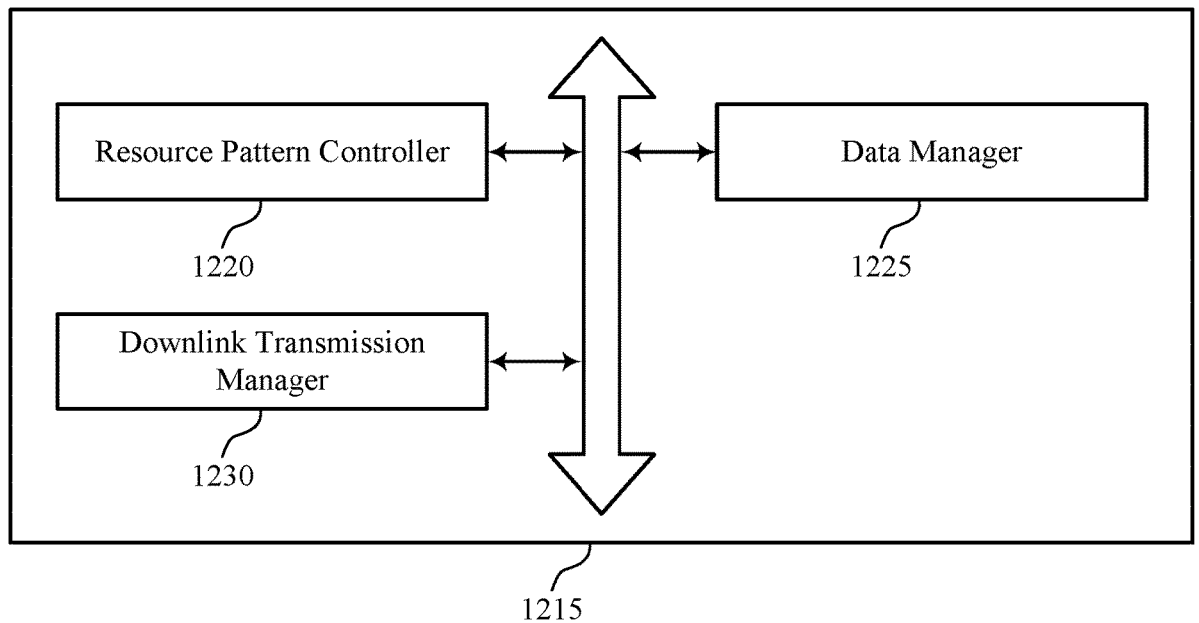

FIG. 12 shows a block diagram 1200 of a base station communications manager 1215 that supports demodulation reference signal transmission for low latency systems in accordance with aspects of the present disclosure. The base station communications manager 1215 may be an example of aspects of a base station communications manager 1315 described with reference to FIGS. 10, 11, and 13. The base station communications manager 1215 may include resource pattern controller 1220, data manager 1225, and downlink transmission manager 1230. Each of these modules may communicate, directly or indirectly, with one another (e.g., via one or more buses).

Resource pattern controller 1220 may transmit signaling scheduling a UE on a set of TTIs and an indicator indicating presence of a DMRS in an indicated TTI of the set of TTIs, the DMRS for demodulation of a data symbol communicated in a second TTI of the set of TTIs. Resource pattern controller 1220 may generate the indicator to indicate presence of the DMRS in a second indicated TTI of the set of TTIs. Resource pattern controller 1220 may generate the signaling to indicate a SPS configuration that identifies a periodicity at which the set of TTIs repeats within a larger set of TTIs. In some cases, the indicated TTI includes a first number of symbol periods and the second TTI includes a second number of symbol periods that differs from the first number of symbol periods. In some cases, transmitting the indicator includes transmitting the indicator in DCI. In some cases, transmitting the signaling includes: transmitting the signaling in RRC signaling. In some cases, the set of TTIs are consecutive TTIs. In some cases, each of the set of TTIs is either a two or three symbol TTI.

Data manager 1225 may determine to skip a downlink data transmission to the UE in the indicated TTI. Downlink transmission manager 1230 may transmit the DMRS in the indicated TTI and the data symbol in the second TTI. Downlink transmission manager 1230 may determine not to transmit data in any of a remaining one or more symbol periods of the set of symbol periods of the indicated TTI. In some cases, transmitting the DMRS in the indicated TTI includes transmitting the DMRS in an indicated symbol period of a set of symbol periods of the indicated TTI.

In some examples of the method, apparatus, and non-transitory computer-readable medium described above, transmitting the DMRS in the indicated TTI comprises: transmitting the DMRS in an indicated symbol period of a plurality of symbol periods of the indicated TTI. Some examples of the method, apparatus, and non-transitory computer-readable medium described above may further include processes, features, means, or instructions for determining not to transmit data in any of a remaining one or more symbol periods of the plurality of symbol periods of the indicated TTI.

Some examples of the method, apparatus, and non-transitory computer-readable medium described above may further include processes, features, means, or instructions for generating the indicator to indicate presence of the DMRS in a second indicated TTI of the plurality of TTIs.

Some examples of the method, apparatus, and non-transitory computer-readable medium described above may further include processes, features, means, or instructions for generating the signaling to indicate a SPS configuration that identifies a periodicity at which the plurality of TTIs repeats within a larger set of TTIs.

In some examples of the method, apparatus, and non-transitory computer-readable medium described above, the indicated TTI comprises a first number of symbol periods and the second TTI comprises a second number of symbol periods that differs from the first number of symbol periods.

In some examples of the method, apparatus, and non-transitory computer-readable medium described above, transmitting the indicator comprises: transmitting the indicator in DCI.

In some examples of the method, apparatus, and non-transitory computer-readable medium described above, transmitting the signaling comprises: transmitting the signaling in radio resource control (RRC) signaling.

In some examples of the method, apparatus, and non-transitory computer-readable medium described above, the plurality of TTIs may be consecutive TTIs.

In some examples of the method, apparatus, and non-transitory computer-readable medium described above, each of the plurality of TTIs may be either a two or three symbol TTI.

Figure 13:
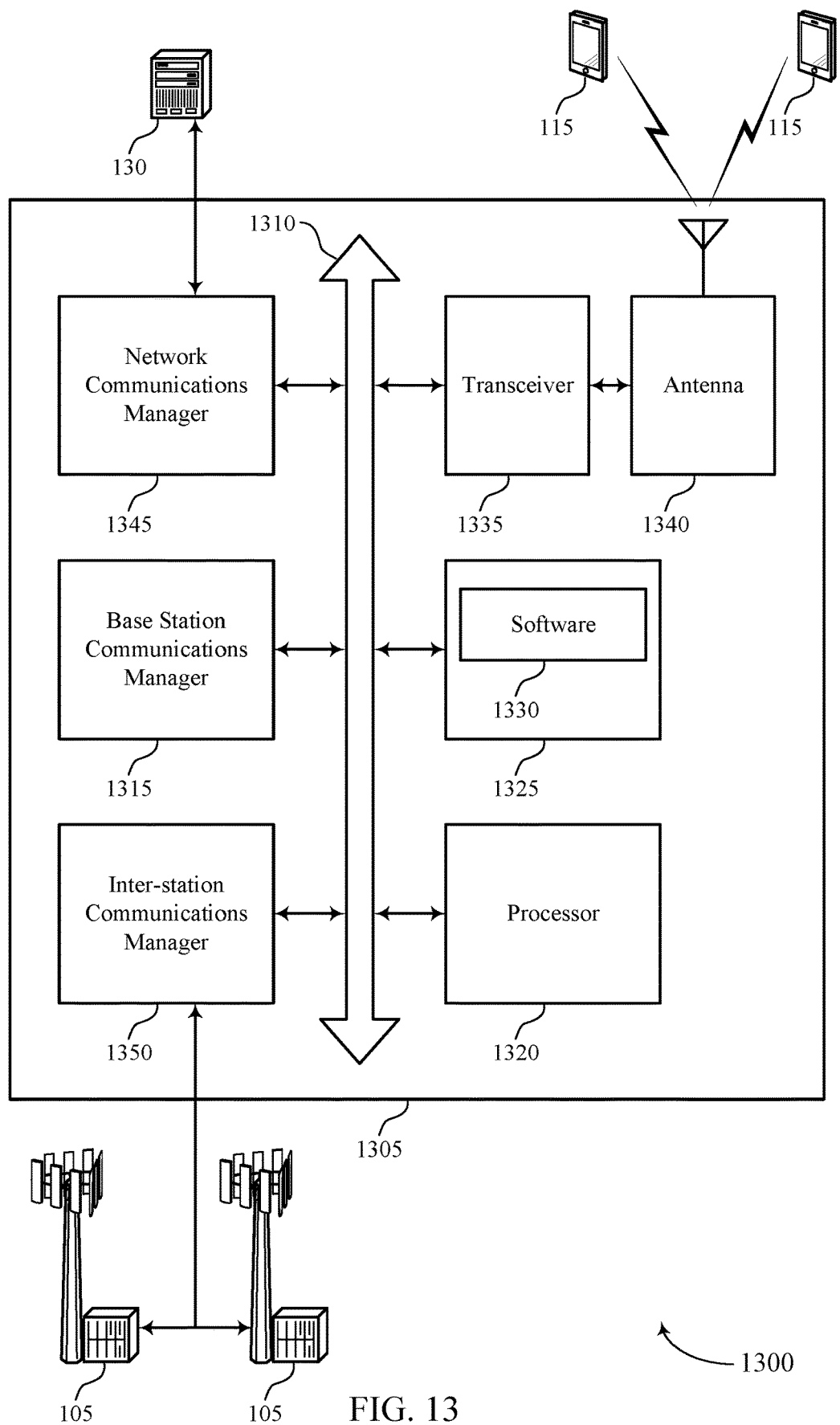
FIG. 13 illustrates a block diagram of a system including a base station that supports demodulation reference signal transmission for low latency systems in accordance with aspects of the present disclosure.

FIG. 13 shows a diagram of a system 1300 including a device 1305 that supports demodulation reference signal transmission for low latency systems in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting demodulation reference signal transmission for low latency systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support demodulation reference signal transmission for low latency systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
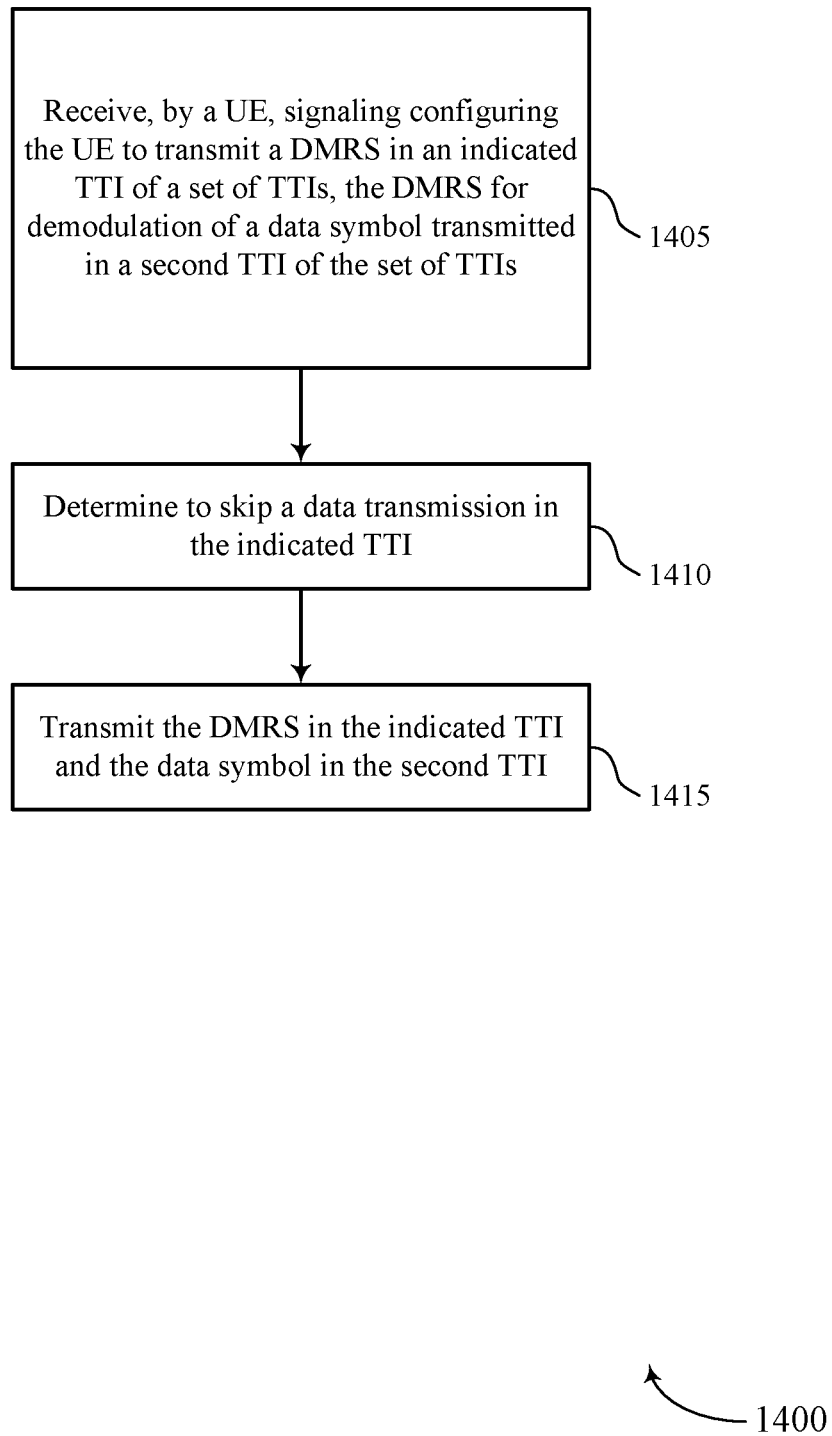
FIGS. 14 through 18 illustrate methods for demodulation reference signal transmission for low latency systems in accordance with aspects of the present disclosure.

FIG. 14 shows a flowchart illustrating a method 1400 for demodulation reference signal transmission for low latency systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive signaling configuring the UE to transmit a DMRS in an indicated TTI of a plurality of TTIs, the DMRS for demodulation of a data symbol transmitted in a second TTI of the plurality of TTIs. The operations of 1405 may be performed according to the methods described herein. In certain examples, aspects of the operations of 1405 may be performed by a resource pattern manager as described with reference to FIGS. 6 through 9.

At 1410 the UE 115 may determine to skip a data transmission in the indicated TTI. The operations of 1410 may be performed according to the methods described herein. In certain examples, aspects of the operations of 1410 may be performed by a data controller as described with reference to FIGS. 6 through 9.

At 1415 the UE 115 may transmit the DMRS in the indicated TTI and the data symbol in the second TTI. The operations of 1415 may be performed according to the methods described herein. In certain examples, aspects of the operations of 1415 may be performed by a uplink transmission manager as described with reference to FIGS. 6 through 9.

Figure 15:
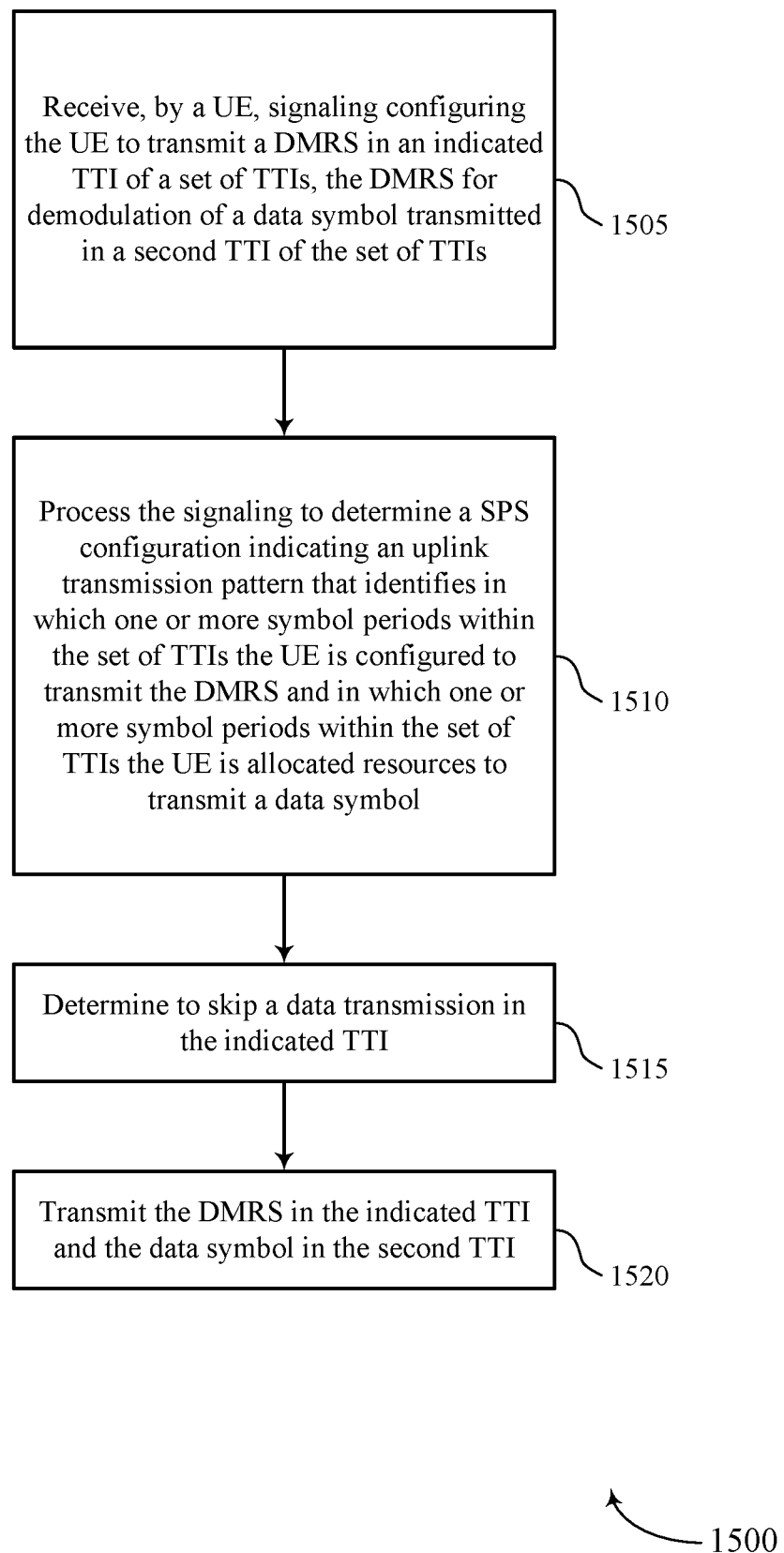

FIG. 15 shows a flowchart illustrating a method 1500 for demodulation reference signal transmission for low latency systems in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive signaling configuring the UE to transmit a DMRS in an indicated TTI of a plurality of TTIs, the DMRS for demodulation of a data symbol transmitted in a second TTI of the plurality of TTIs. The operations of 1505 may be performed according to the methods described herein. In certain examples, aspects of the operations of 1505 may be performed by a resource pattern manager as described with reference to FIGS. 6 through 9.

At 1510 the UE 115 may process the signaling to determine a SPS configuration indicating an uplink transmission pattern that identifies in which one or more symbol periods within the plurality of TTIs the UE is configured to transmit the DMRS and in which one or more symbol periods within the plurality of TTIs the UE is allocated resources to transmit a data symbol. The operations of 1510 may be performed according to the methods described herein. In certain examples, aspects of the operations of 1510 may be performed by a resource pattern manager as described with reference to FIGS. 6 through 9.

At 1515 the UE 115 may determine to skip a data transmission in the indicated TTI. The operations of 1515 may be performed according to the methods described herein. In certain examples, aspects of the operations of 1515 may be performed by a data controller as described with reference to FIGS. 6 through 9.

At 1520 the UE 115 may transmit the DMRS in the indicated TTI and the data symbol in the second TTI. The operations of 1520 may be performed according to the methods described herein. In certain examples, aspects of the operations of 1520 may be performed by a uplink transmission manager as described with reference to FIGS. 6 through 9.

Figure 16:
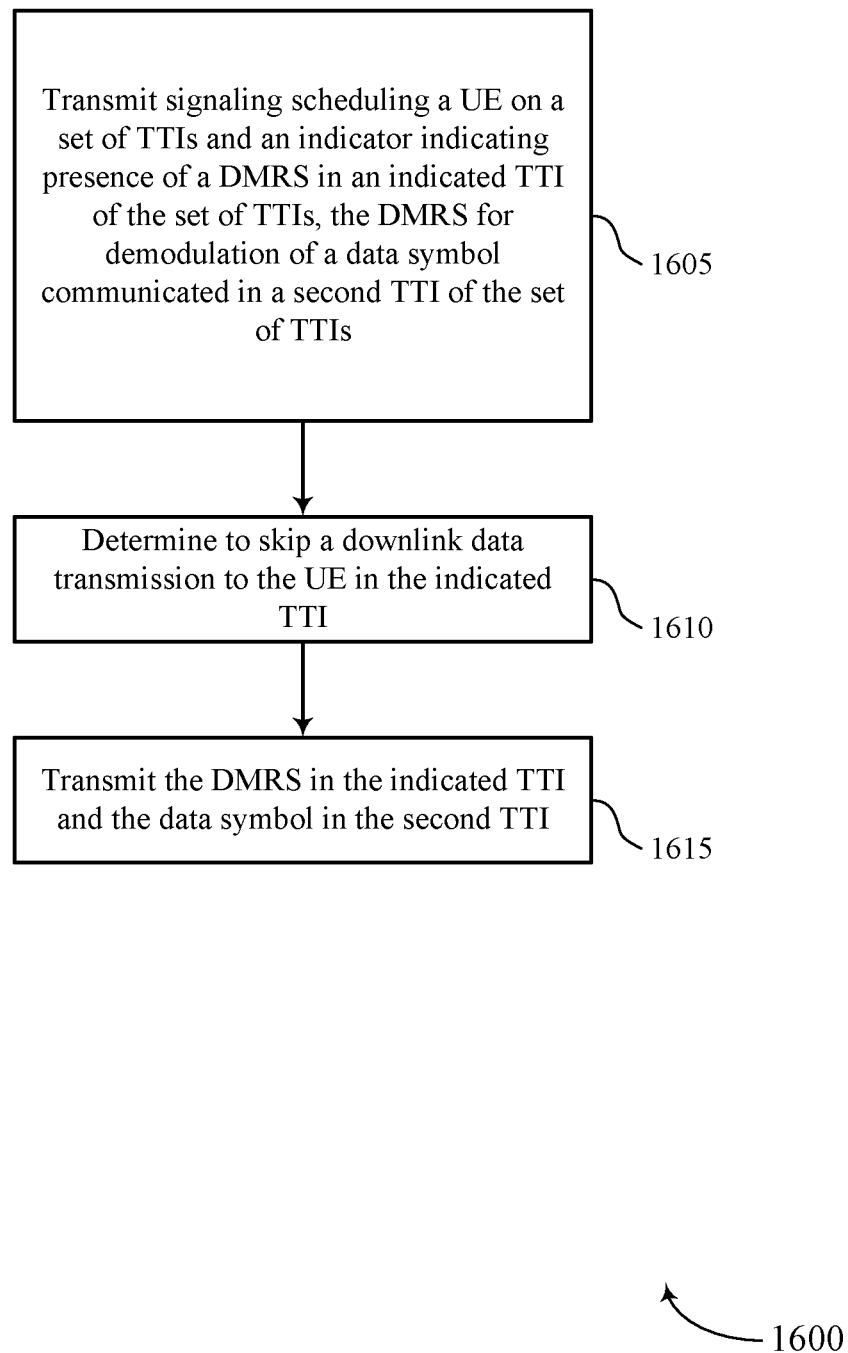

FIG. 16 shows a flowchart illustrating a method 1600 for demodulation reference signal transmission for low latency systems in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit signaling scheduling a UE on a plurality of TTIs and an indicator indicating presence of a DMRS in an indicated TTI of the plurality of TTIs, the DMRS for demodulation of a data symbol communicated in a second TTI of the plurality of TTIs. The operations of 1605 may be performed according to the methods described herein. In certain examples, aspects of the operations of 1605 may be performed by a resource pattern controller as described with reference to FIGS. 10 through 13.

At 1610 the base station 105 may determine to skip a downlink data transmission to the UE in the indicated TTI. The operations of 1610 may be performed according to the methods described herein. In certain examples, aspects of the operations of 1610 may be performed by a data manager as described with reference to FIGS. 10 through 13.

At 1615 the base station 105 may transmit the DMRS in the indicated TTI and the data symbol in the second TTI. The operations of 1615 may be performed according to the methods described herein. In certain examples, aspects of the operations of 1615 may be performed by a downlink transmission manager as described with reference to FIGS. 10 through 13.

Figure 17:
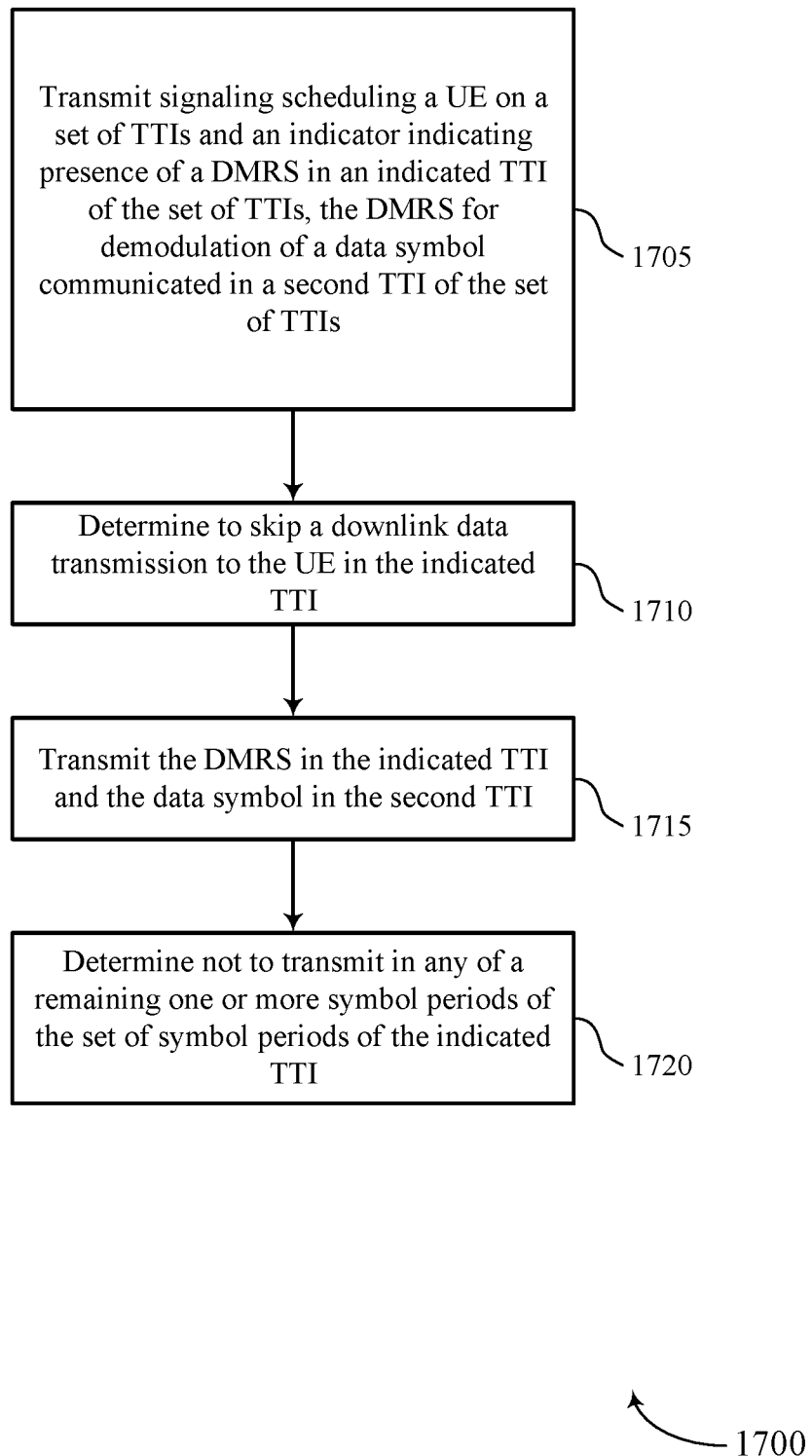

FIG. 17 shows a flowchart illustrating a method 1700 for demodulation reference signal transmission for low latency systems in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit signaling scheduling a UE) on a plurality of TTIs and an indicator indicating presence of a DMRS in an indicated TTI of the plurality of TTIs, the DMRS for demodulation of a data symbol communicated in a second TTI of the plurality of TTIs. The operations of 1705 may be performed according to the methods described herein. In certain examples, aspects of the operations of 1705 may be performed by a resource pattern controller as described with reference to FIGS. 10 through 13.

At 1710 the base station 105 may determine to skip a downlink data transmission to the UE in the indicated TTI. The operations of 1710 may be performed according to the methods described herein. In certain examples, aspects of the operations of 1710 may be performed by a data manager as described with reference to FIGS. 10 through 13.

At 1715 the base station 105 may transmit the DMRS in the indicated TTI and the data symbol in the second TTI. In some cases, transmitting the DMRS in the indicated TTI includes transmitting the DMRS in an indicated symbol period of a plurality of symbol periods of the indicated TTI. The operations of 1715 may be performed according to the methods described herein. In certain examples, aspects of the operations of 1715 may be performed by a downlink transmission manager as described with reference to FIGS. 10 through 13.

At 1720 the base station 105 may determine not to transmit data in any of a remaining one or more symbol periods of the plurality of symbol periods of the indicated TTI. The operations of 1720 may be performed according to the methods described herein. In certain examples, aspects of the operations of 1720 may be performed by a downlink transmission manager as described with reference to FIGS. 10 through 13.

Figure 18:
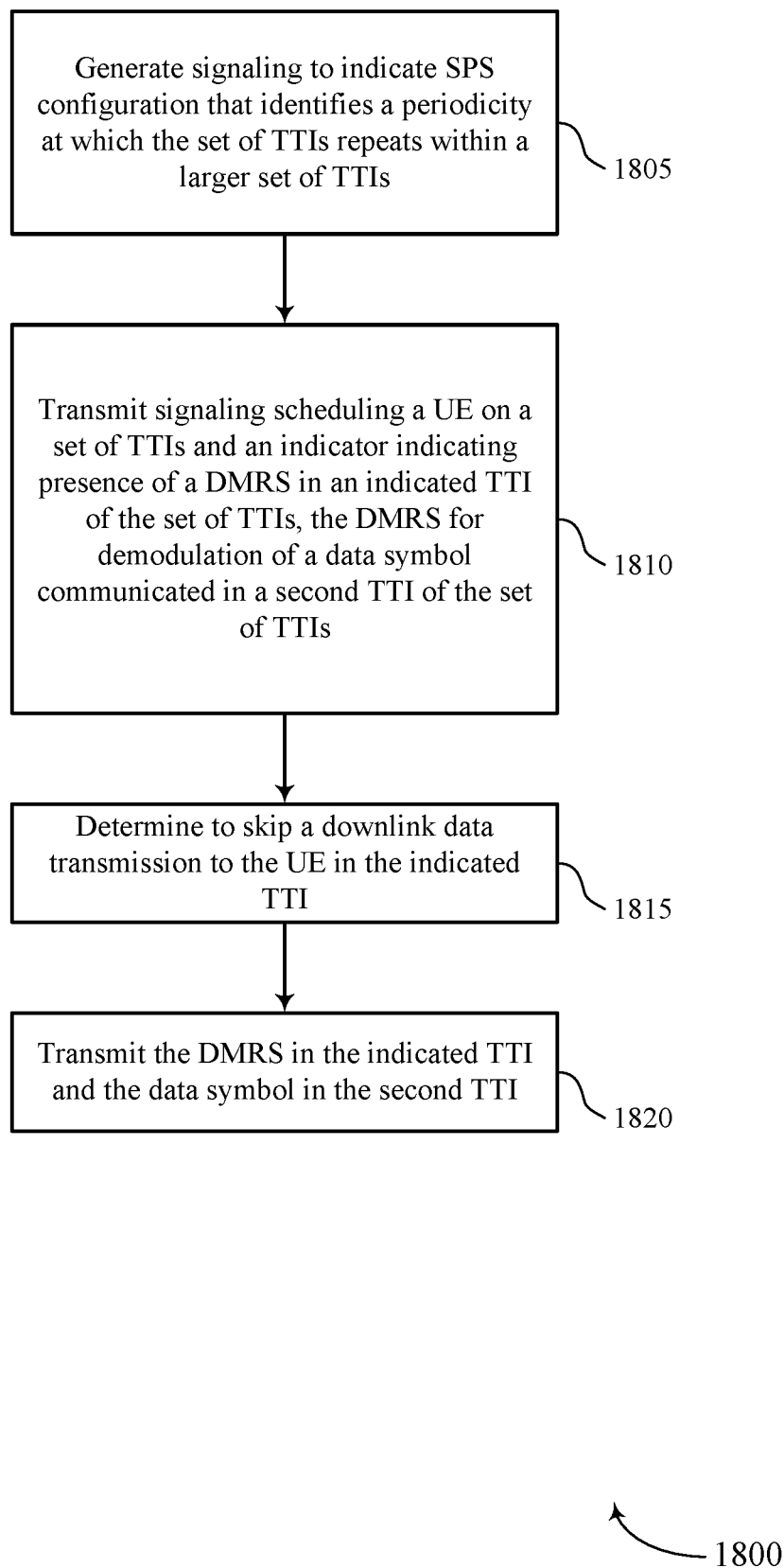

FIG. 18 shows a flowchart illustrating a method 1800 for demodulation reference signal transmission for low latency systems in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may generate the signaling to indicate a SPS configuration that identifies a periodicity at which the plurality of TTIs repeats within a larger set of TTIs. The operations of 1805 may be performed according to the methods described herein. In certain examples, aspects of the operations of 1805 may be performed by a resource pattern controller as described with reference to FIGS. 10 through 13.

At 1810 the base station 105 may transmit signaling scheduling a UE on a plurality of TTIs and an indicator indicating presence of a DMRS in an indicated TTI of the plurality of TTIs, the DMRS for demodulation of a data symbol communicated in a second TTI of the plurality of TTIs. The operations of 1810 may be performed according to the methods described herein. In certain examples, aspects of the operations of 1810 may be performed by a resource pattern controller as described with reference to FIGS. 10 through 13.

At 1815 the base station 105 may determine to skip a downlink data transmission to the UE in the indicated TTI. The operations of 1815 may be performed according to the methods described herein. In certain examples, aspects of the operations of 1815 may be performed by a data manager as described with reference to FIGS. 10 through 13.

At 1820 the base station 105 may transmit the DMRS in the indicated TTI and the data symbol in the second TTI. The operations of 1820 may be performed according to the methods described herein. In certain examples, aspects of the operations of 1820 may be performed by a downlink transmission manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, by a user equipment (UE), signaling configuring the UE to transmit a demodulation reference signal (DMRS) in a first portion of an indicated transmission time interval (TTI) of a plurality of TTIs, the DMRS for demodulation of a data symbol transmitted in a second TTI of the plurality of TTIs; and
in response to a determination to skip a data transmission in a second portion of the indicated TTI:
transmitting the DMRS in the first portion of the indicated TTI;
not transmitting during the second portion of the indicated TTI; and
transmitting the data symbol in the second TTI.

2. The method of claim 1, wherein transmitting the DMRS in the first portion of the indicated TTI comprises:
transmitting the DMRS in an indicated symbol period of a plurality of symbol periods of the indicated TTI; and
determining not to transmit in any of a remaining one or more symbol periods of the plurality of symbol periods of the indicated TTI.

3. The method of claim 1, further comprising:
processing the signaling to determine a semi-persistent scheduling (SPS) configuration indicating an uplink transmission pattern that identifies in which one or more symbol periods within the plurality of TTIs the UE is configured to transmit the DMRS and in which one or more symbol periods within the plurality of TTIs the UE is allocated resources to transmit a data symbol.

4. The method of claim 1, further comprising:
processing the signaling to identify that the UE is allocated resources to transmit a plurality of data symbols including the data symbol in the second TTI.

5. The method of claim 1, wherein receiving the signaling comprises:
receiving a grant that allocates resources to the UE in the plurality of TTIs and an indicator that only the indicated TTI of the plurality of TTIs is to include the DMRS.

6. The method of claim 1, wherein the indicated TTI comprises a first number of symbol periods and the second TTI comprises a second number of symbol periods that differs from the first number of symbol periods.

7. The method of claim 1, wherein the plurality of TTIs are consecutive TTIs.

8. The method of claim 1, wherein each of the plurality of TTIs is either a two or three symbol TTI.

9. A method for wireless communication, comprising:
transmitting signaling scheduling a user equipment (UE) on a plurality of transmission time intervals (TTIs) and an indicator indicating presence of a demodulation reference signal (DMRS) in a first portion of an indicated TTI of the plurality of TTIs, the DMRS for demodulation of a data symbol communicated in a second TTI of the plurality of TTIs; and
in response to a determination to skip a data transmission in a second portion of the indicated TTI:
transmitting the DMRS in the first portion of the indicated TTI;
not transmitting during the second portion of the indicated TTI; and
transmitting the data symbol in the second TTI.

10. The method of claim 9, wherein transmitting the DMRS in the first portion of the indicated TTI comprises:
transmitting the DMRS in an indicated symbol period of a plurality of symbol periods of the indicated TTI; and
determining not to transmit data in any of a remaining one or more symbol periods of the plurality of symbol periods of the indicated TTI.

11. The method of claim 9, further comprising:
generating the indicator to indicate presence of the DMRS in a second indicated TTI of the plurality of TTIs.

12. The method of claim 9, further comprising:
generating the signaling to indicate a semi-persistent scheduling (SPS) configuration that identifies a periodicity at which the plurality of TTIs repeats within a larger set of TTIs.

13. The method of claim 9, wherein the indicated TTI comprises a first number of symbol periods and the second TTI comprises a second number of symbol periods that differs from the first number of symbol periods.

14. The method of claim 9, wherein transmitting the indicator comprises:
transmitting the indicator in downlink control information (DCI).

15. The method of claim 9, wherein transmitting the signaling comprises:
transmitting the signaling in radio resource control (RRC) signaling.

16. The method of claim 9, wherein the plurality of TTIs are consecutive TTIs.

17. The method of claim 9, wherein each of the plurality of TTIs is either a two or three symbol TTI.

18. An apparatus for wireless communication, comprising:
means for receiving signaling configuring the apparatus to transmit a demodulation reference signal (DMRS) in a first portion of an indicated transmission time interval (TTI) of a plurality of TTIs, the DMRS for demodulation of a data symbol transmitted in a second TTI of the plurality of TTIs;
means for determining to skip a data transmission in a second portion of the indicated TTI; and
means for transmitting the DMRS in the first portion of the indicated TTI, not transmitting during the second portion of the indicated TTI, and transmitting the data symbol in the second TTI.

19. The apparatus of claim 18, wherein the means for transmitting the DMRS in the first portion of the indicated TTI comprises:
means for transmitting the DMRS in an indicated symbol period of a plurality of symbol periods of the indicated TTI; and
means for determining not to transmit in any of a remaining one or more symbol periods of the plurality of symbol periods of the indicated TTI.

20. The apparatus of claim 18, further comprising:
means for processing the signaling to determine a semi-persistent scheduling (SPS) configuration indicating an uplink transmission pattern that identifies in which one or more symbol periods within the plurality of TTIs the apparatus is configured to transmit the DMRS and in which one or more symbol periods within the plurality of TTIs the apparatus is allocated resources to transmit a data symbol.

21. The apparatus of claim 18, further comprising:
means for processing the signaling to identify that the apparatus is allocated resources to transmit a plurality of data symbols including the data symbol in the second TTI.

22. The apparatus of claim 18, wherein the means for receiving the signaling comprises:

means for receiving a grant that allocates resources to the apparatus in the plurality of TTIs and an indicator that only the indicated TTI of the plurality of TTIs is to include the DMRS.

23. The apparatus of claim 18, wherein the indicated TTI comprises a first number of symbol periods and the second TTI comprises a second number of symbol periods that differs from the first number of symbol periods.

24. The apparatus of claim 18, wherein the plurality of TTIs are consecutive TTIs.

25. The apparatus of claim 18, wherein each of the plurality of TTIs is either a two or three symbol TTI.

26. An apparatus for wireless communication, comprising:
    means for transmitting signaling scheduling a user equipment (UE) on a plurality of transmission time intervals (TTIs) and an indicator indicating presence of a demodulation reference signal (DMRS) in a first portion of an indicated TTI of the plurality of TTIs, the DMRS for demodulation of a data symbol communicated in a second TTI of the plurality of TTIs;
    means for determining to skip a downlink data transmission to the UE in a second portion of the indicated TTI; and
    means for transmitting the DMRS in the first portion of the indicated TTI, not transmitting during the second portion of the indicated TTI, and transmitting the data symbol in the second TTI.

27. The apparatus of claim 26, wherein the means for transmitting the DMRS in the first portion of the indicated TTI comprises:
    means for transmitting the DMRS in an indicated symbol period of a plurality of symbol periods of the indicated TTI; and
    means for determining not to transmit data in any of a remaining one or more symbol periods of the plurality of symbol periods of the indicated TTI.

28. The apparatus of claim 26, further comprising:
    means for generating the indicator to indicate presence of the DMRS in a second indicated TTI of the plurality of TTIs.

29. The apparatus of claim 26, further comprising:
    means for generating the signaling to indicate a semi-persistent scheduling (SPS) configuration that identifies a periodicity at which the plurality of TTIs repeats within a larger set of TTIs.

30. The apparatus of claim 26, wherein the indicated TTI comprises a first number of symbol periods and the second TTI comprises a second number of symbol periods that differs from the first number of symbol periods.

31. The apparatus of claim 26, wherein the means for transmitting the indicator comprises:
    means for transmitting the indicator in downlink control information (DCI).

32. The apparatus of claim 26, wherein the means for transmitting the signaling comprises:
    means for transmitting the signaling in radio resource control (RRC) signaling.

33. The apparatus of claim 26, wherein the plurality of TTIs are consecutive TTIs.

34. The apparatus of claim 26, wherein each of the plurality of TTIs is either a two or three symbol TTI.

35. An apparatus for wireless communication, comprising:
    a processor;
    memory in electronic communication with the processor; and
    instructions stored in the memory and executable by the processor to cause the apparatus to:
    receive signaling configuring the apparatus to transmit a demodulation reference signal (DMRS) in a first portion of an indicated transmission time interval (TTI) of a plurality of TTIs, the DMRS for demodulation of a data symbol transmitted in a second TTI of the plurality of TTIs; and
    in response to a determination to skip a data transmission in a second portion of the indicated TTI:
    transmit the DMRS in the first portion of the indicated TTI;
    not transmit during the second portion of the indicated TTI; and
    transmit the data symbol in the second TTI.

36. The apparatus of claim 35, wherein the instructions to transmit the DMRS in the first portion of the indicated TTI are executable by the processor to cause the apparatus to:
    transmit the DMRS in an indicated symbol period of a plurality of symbol periods of the indicated TTI; and
    determine not to transmit in any of a remaining one or more symbol periods of the plurality of symbol periods of the indicated TTI.

37. The apparatus of claim 35, wherein the instructions are further executable by the processor to cause the apparatus to:
    process the signaling to determine a semi-persistent scheduling (SPS) configuration indicating an uplink transmission pattern that identifies in which one or more symbol periods within the plurality of TTIs the apparatus is configured to transmit the DMRS and in which one or more symbol periods within the plurality of TTIs the apparatus is allocated resources to transmit a data symbol.

38. The apparatus of claim 35, wherein the instructions are further executable by the processor to cause the apparatus to:
    process the signaling to identify that the apparatus is allocated resources to transmit a plurality of data symbols including the data symbol in the second TTI.

39. The apparatus of claim 35, wherein the instructions to receive the signaling are executable by the processor to cause the apparatus to:
    receive a grant that allocates resources to the apparatus in the plurality of TTIs and an indicator that only the indicated TTI of the plurality of TTIs is to include the DMRS.

40. The apparatus of claim 35, wherein the indicated TTI comprises a first number of symbol periods and the second TTI comprises a second number of symbol periods that differs from the first number of symbol periods.

41. The apparatus of claim 35, wherein the plurality of TTIs are consecutive TTIs.

42. The apparatus of claim 35, wherein each of the plurality of TTIs is either a two or three symbol TTI.

43. An apparatus for wireless communication, comprising:
    a processor;
    memory in electronic communication with the processor; and
    instructions stored in the memory and executable by the processor to cause the apparatus to:
    transmit signaling scheduling a user equipment (UE) on a plurality of transmission time intervals (TTIs) and an indicator indicating presence of a demodulation reference signal (DMRS) in a first portion of an indicated TTI of the plurality of TTIs, the DMRS for demodulation of a data symbol communicated in a second TTI of the plurality of TTIs; and in response to a determination to skip a downlink data transmission to the UE in a second portion of the indicated TTI:

transmit the DMRS in the first portion of the indicated TTI;

not transmit during the second portion of the indicated TTI; and transmit the data symbol in the second TTI.

44. The apparatus of claim 43, wherein the instructions to transmit the DMRS in the first portion of the indicated TTI are executable by the processor to cause the apparatus to:

transmit the DMRS in an indicated symbol period of a plurality of symbol periods of the indicated TTI; and determine not to transmit data in any of a remaining one or more symbol periods of the plurality of symbol periods of the indicated TTI.

45. The apparatus of claim 43, wherein the instructions are further executable by the processor to cause the apparatus to:

generate the indicator to indicate presence of the DMRS in a second indicated TTI of the plurality of TTIs.

46. The apparatus of claim 43, wherein the instructions are further executable by the processor to cause the apparatus to:

generate the signaling to indicate a semi-persistent scheduling (SPS) configuration that identifies a periodicity at which the plurality of TTIs repeats within a larger set of TTIs.

47. The apparatus of claim 43, wherein the indicated TTI comprises a first number of symbol periods and the second TTI comprises a second number of symbol periods that differs from the first number of symbol periods.

48. The apparatus of claim 43, wherein the instructions to transmit the indicator are executable by the processor to cause the apparatus to:

transmit the indicator in downlink control information (DCI).

49. The apparatus of claim 43, wherein the instructions to transmit the signaling are executable by the processor to cause the apparatus to:

transmit the signaling in radio resource control (RRC) signaling.

50. The apparatus of claim 43, wherein the plurality of TTIs are consecutive TTIs.

51. The apparatus of claim 43, wherein each of the plurality of TTIs is either a two or three symbol TTI.

52. The method of claim 1, wherein the first portion of the indicated TTI and the second portion of the indicated TTI comprise mutually exclusive symbol periods.

53. The method of claim 9, wherein the first portion of the indicated TTI and the second portion of the indicated TTI comprise mutually exclusive symbol periods.

54. The apparatus of claim 35, wherein the first portion of the indicated TTI and the second portion of the indicated TTI comprise mutually exclusive symbol periods.

55. The apparatus of claim 43, wherein the first portion of the indicated TTI and the second portion of the indicated TTI comprise mutually exclusive symbol periods.

* * * * *